(12) United States Patent
Yamaguchi et al.

(10) Patent No.: US 10,239,530 B2
(45) Date of Patent: Mar. 26, 2019

(54) VEHICLE CONTROL APPARATUS FOR A REGENERATIVE BRAKING SYSTEM BASED ON THE BATTERY INPUT POWER

(71) Applicant: TOYOTA JIDOSHA KABUSHIKI KAISHA, Toyota-shi, Aichi-ken (JP)

(72) Inventors: Takuya Yamaguchi, Susono (JP); Takashi Kawai, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/320,573

(22) PCT Filed: Jun. 17, 2015

(86) PCT No.: PCT/IB2015/000973
§ 371 (c)(1),
(2) Date: Dec. 20, 2016

(87) PCT Pub. No.: WO2015/198119
PCT Pub. Date: Dec. 30, 2015

(65) Prior Publication Data
US 2017/0137031 A1 May 18, 2017

(30) Foreign Application Priority Data
Jun. 25, 2014 (JP) ................. 2014-130437

(51) Int. Cl.
*B60T 13/58* (2006.01)
*B60L 7/16* (2006.01)
(Continued)

(52) U.S. Cl.
CPC ......... *B60W 30/18127* (2013.01); *B60L 7/16* (2013.01); *B60L 7/26* (2013.01);
(Continued)

(58) Field of Classification Search
CPC .... B60T 13/585; B60T 13/586; B60W 10/08; B60W 10/188; B60W 30/18127;
(Continued)

(56) References Cited

U.S. PATENT DOCUMENTS 5,287,772 A * 2/1994 Aoki ........................ B60K 1/00
180/165
5,318,355 A * 6/1994 Asanuma ................ B60L 3/108
180/165
(Continued)

FOREIGN PATENT DOCUMENTS

CN 1638987 A 7/2005
EP 2173018 A1 * 4/2010 ................ B60L 7/16
(Continued)

*Primary Examiner* — Thomas J Williams
(74) *Attorney, Agent, or Firm* — Hunton Andrews Kurth LLP

(57) ABSTRACT

A vehicle control apparatus is a vehicle control apparatus controlling a vehicle and provided with a regenerative device generating electric power while applying a regenerative braking force by performing regenerative electric power generation, an electric power supply capable of exchanging electric power with the regenerative device, and a hydraulic device applying a hydraulic braking force attributable to a hydraulic pressure, and is provided with an electronic control device controlling the regenerative device and the hydraulic device so as to adjust the ratios of the regenerative braking force and the hydraulic braking force to a required braking force required for the braking of the vehicle based on an input electric power value input into the electric power supply.

15 Claims, 15 Drawing Sheets

(51) Int. Cl.
*B60L 7/26* (2006.01)
*B60W 30/18* (2012.01)
*B60W 10/08* (2006.01)
*B60W 10/188* (2012.01)
*B60L 15/20* (2006.01)
*B60T 8/50* (2006.01)

(52) U.S. Cl.
CPC ............ B60L 15/2009 (2013.01); B60T 8/50 (2013.01); B60T 13/586 (2013.01); B60W 10/08 (2013.01); B60W 10/188 (2013.01); *B60W 2510/085* (2013.01); *B60W 2710/182* (2013.01); *Y02T 10/7258* (2013.01)

(58) Field of Classification Search
CPC ...... B60L 7/16; B60L 7/18; B60L 7/26; B60L 15/2009
See application file for complete search history.

(56) References Cited

U.S. PATENT DOCUMENTS

| | | | |
|---|---|---|---|
| 5,399,000 A * | 3/1995 | Aoki | B60L 7/26 180/165 |
| 5,898,282 A * | 4/1999 | Drozdz | B60L 11/123 180/65.235 |
| 6,278,915 B1 | 8/2001 | Deguchi et al. | |
| 6,909,200 B2 * | 6/2005 | Bouchon | B60K 6/28 180/65.245 |
| 9,013,135 B2 * | 4/2015 | Kitanaka | B60L 7/16 318/800 |
| 2005/0057098 A1 | 3/2005 | Bouchon | |
| 2008/0185199 A1 | 8/2008 | Kimura et al. | |
| 2014/0121870 A1 | 5/2014 | Lee | |
| 2015/0202964 A1* | 7/2015 | Nefcy | B60L 7/18 701/70 |

FOREIGN PATENT DOCUMENTS

| | | |
|---|---|---|
| EP | 2666692 A1 | 11/2013 |
| JP | S60-046701 A | 3/1985 |
| JP | S61-262005 A | 11/1986 |
| JP | H05-199606 A | 8/1993 |
| JP | 2000-236601 A | 8/2000 |
| JP | 2004-064840 A | 2/2004 |
| JP | 2008-189259 A | 8/2008 |
| JP | 2010-141997 A | 6/2010 |
| JP | 2011-056969 A | 3/2011 |
| JP | 2011-097666 A | 5/2011 |
| WO | 03/072389 A1 | 9/2003 |

* cited by examiner

FIG. 4A
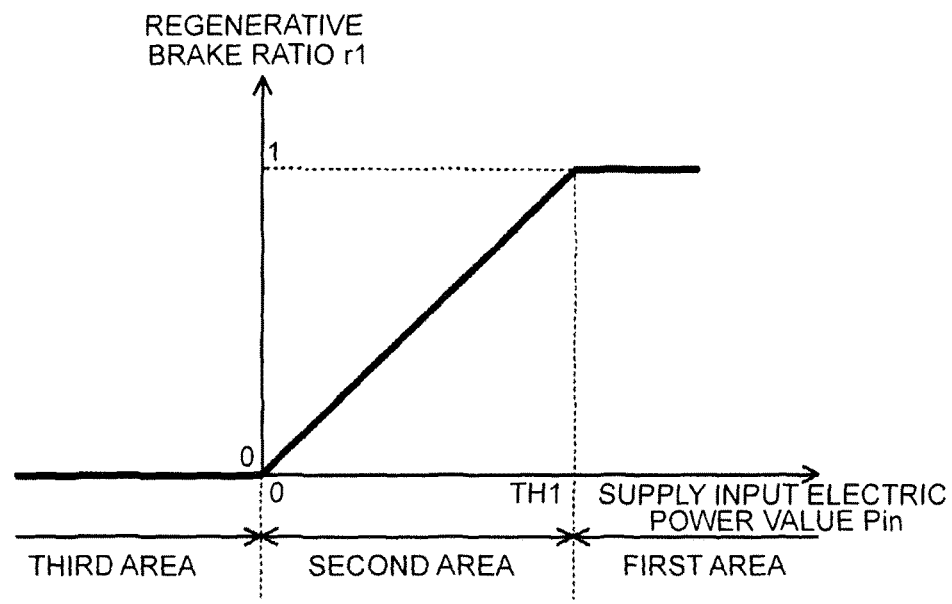
FIG. 4B        FIG. 4C        FIG. 4D
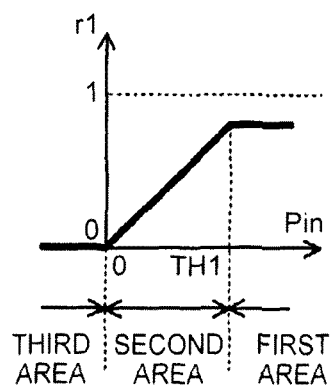   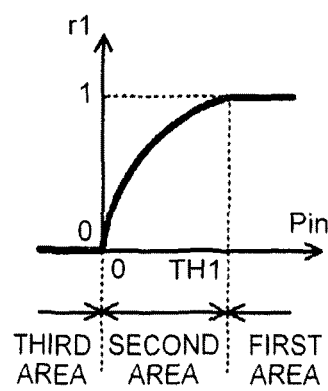   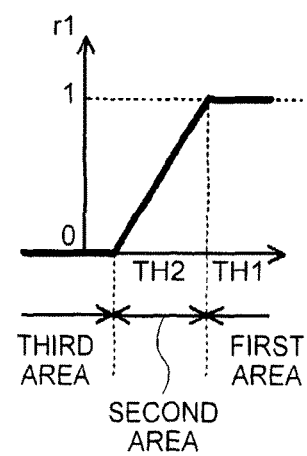

VEHICLE CONTROL APPARATUS FOR A REGENERATIVE BRAKING SYSTEM BASED ON THE BATTERY INPUT POWER

CROSS-REFERENCE TO RELATED APPLICATIONS

This is a national phase application based on the PCT International Patent Application No. PCT/162015/000973 filed Jun. 17, 2015, claiming priority to Japanese Patent Application No. 2014-130437 filed Jun. 25, 2014, the entire contents of both of which are incorporated herein by reference.

BACKGROUND OF THE INVENTION

1. Field of the Invention

The invention relates to, for example, a technical field of a vehicle control apparatus controlling a vehicle capable of performing regenerative electric power generation.

2. Description of Related Art

A vehicle capable of performing regenerative electric power generation, such as a hybrid vehicle and an electric car, is known. The vehicle is provided with a rotary electric machine (for example, a motor generator or an alternator) having, for example, a rotating shaft directly or indirectly connected to a drive shaft of the vehicle so as to perform the regenerative electric power generation. In this case, the kinetic energy of the vehicle is converted into the rotational energy of the rotating shaft of the rotary electric machine, and thus the rotary electric machine can apply a regenerative braking force offsetting the kinetic energy of the vehicle to the vehicle while generating electric power.

Japanese Patent Application Publication No. 2011-056969 (JP 2011-056969 A) and Japanese Patent Application Publication No. 2011-097666 (JP 2011-097666 A) disclose examples of the vehicle performing the regenerative electric power generation. JP 2011-056969 A, in particular, discloses a vehicle in which the regenerative braking force decreases (that is, the electric power that is generated by the regenerative electric power generation decreases) as the speed of the vehicle decreases and the regenerative braking force becomes zero (that is, the regenerative electric power generation stops) when the speed of the vehicle decreases to a certain predetermined value.

The electric power that the rotary electric machine generates by the regenerative electric power generation is input into a battery (or any electric power storage device such as a capacitor). As a result, the battery is charged with the electric power that the rotary electric machine generates by the regenerative electric power generation. Accordingly, a method for increasing the amount of the electric power that the rotary electric machine generates by the regenerative electric power generation is one of the methods for increasing the amount of the charging of the battery (that is, the amount of the electric power that is input into the battery).

It is considered to be preferable to decrease the vehicle speed at which the regenerative electric power generation stops to the minimum (typically, to zero) so that the amount of the electric power that the rotary electric machine generates by the regenerative electric power generation increases. In a case where the vehicle speed is relatively or extremely low, however, the electric power that is generated by the rotary electric machine may not be input into the battery (that is, the battery may not be charged). Alternatively, in a case where the vehicle speed is relatively or extremely low, the electric power may be output from the battery (that is, the battery may be discharged) despite the generation of the electric power by the regenerative electric power generation performed by the rotary electric machine.

For example, it is practically rare that the entire electric power that the rotary electric machine generates by the regenerative electric power generation is input into the battery. Specifically, at least part of the electric power that the rotary electric machine generates by the regenerative electric power generation may become a loss attributable to the rotary electric machine itself. In addition, at least part of the electric power that the rotary electric machine generates by the regenerative electric power generation may become a loss attributable to various types of electric power equipment in view of the fact that the various types of electric power equipment (for example, inverter, converter, and the like) arranged between the rotary electric machine and the battery need to be driven for the rotary electric machine to perform the regenerative electric power generation. In a case where the vehicle speed is relatively or extremely low, the amount of the electric power that the rotary electric machine generates by the regenerative electric power generation is relatively or extremely small as well. Accordingly, if the rotary electric machine performs the regenerative electric power generation even in a case where the vehicle speed is relatively or extremely low, the entire electric power that the rotary electric machine generates by the regenerative electric power generation may be consumed as a loss or the electric power may be output from the battery to drive the various types of electric power equipment. It cannot be said that these situations are preferable because these situations exacerbate the efficiency of the use of the battery.

If the vehicle speed at which the regenerative electric power generation stops becomes relatively higher, a situation becomes less likely to occur in which the electric power is output from the battery despite the generation of the electric power by the regenerative electric power generation of the rotary electric machine. In a case where the regenerative electric power generation is stopped in a state where the vehicle speed is relatively high, however, the regenerative electric power generation may be stopped despite the amount of the electric power that the rotary electric machine generates by the regenerative electric power generation being correspondingly large. As a result, the amount of the electric power that is input into the battery from the rotary electric machine during the regenerative electric power generation may be excessively decreased (that is, decreased more than necessary).

In the related art for adjusting the regenerative braking force (or stopping the regenerative electric power generation) based on the vehicle speed, it is technically difficult, as described above, to correspondingly or relatively increase the amount of the electric power that is input into the battery from the rotary electric machine during the regenerative electric power generation while suppressing the output of the electric power from the battery during the regenerative electric power generation. In other words, in the related art for adjusting the regenerative braking force (or stopping the regenerative electric power generation) based on the vehicle speed, it is technically difficult to suppress both the output of the electric power from the battery during the regenerative electric power generation and an excessive decrease in the amount of the electric power input into the battery from the rotary electric machine during the regenerative electric power generation.

SUMMARY OF THE INVENTION

In view of the above, the invention provides a vehicle control apparatus that is capable of correspondingly or relatively increasing the amount of the electric power which is input from a regenerative device such as a rotary electric machine into an electric power supply during regenerative electric power generation while suppressing the output of electric power from the electric power supply provided with a battery or the like.

A first aspect of the invention provides a vehicle control apparatus including a regenerative device, an electric power supply, a hydraulic device, and an electronic control device. The regenerative device is configured to generate electric power by performing regenerative operation, while applying a regenerative braking force. The electric power supply is configured to exchange electric power with the regenerative device. The hydraulic device is configured to apply a hydraulic braking force attributable to a hydraulic pressure. The electronic control device is configured to control the regenerative device and the hydraulic device so as to adjust a ratio of the regenerative braking force and the hydraulic braking force to a required braking force required for the braking of the vehicle based on an input electric power value showing the magnitude of the electric power inputted into the electric power supply.

A second aspect of the invention provides a vehicle control apparatus including a regenerative device, an electric power supply, a hydraulic device, an acquisition device, and an electronic control device. The regenerative device is configured to generate electric power by performing regenerative operation, while applying a regenerative braking force. The electric power supply is configured to exchange electric power with the regenerative device. The hydraulic device is configured to apply a hydraulic braking force attributable to a hydraulic pressure. The acquisition device is configured to acquire an input electric power value showing the magnitude of the electric power input into the electric power supply. The electronic control device is configured to control the regenerative device and the hydraulic device so as to adjust a ratio of the regenerative braking force and the hydraulic braking force to a required braking force required for the braking of the vehicle based on the input electric power value showing the magnitude of the electric power input into the electric power supply.

According to the vehicle control apparatus described above, it is possible to control a vehicle including the regenerative device, the electric power supply, and the hydraulic device, a vehicle including the regenerative device, the electric power supply, and the hydraulic device, or a vehicle including the regenerative device, the electric power supply, the hydraulic device, and the acquisition device. The regenerative device is capable of performing the regenerative electric power generation. In other words, the regenerative device is capable of generating electric power. The electric power supply is capable of exchanging electric power with the regenerative device. Accordingly, at least part of the electric power that is generated by the regenerative device is input into the electric power supply. In this case, it is preferable that the electric power supply accumulates (that is, stores) at least part of the electric power generated by the regenerative device by using, for example, an electric power storage device (described later). In addition, the regenerative device is capable of applying the regenerative braking force to the vehicle during the generation of the electric power since the regenerative device performs the regenerative electric power generation. In addition, the hydraulic device is capable of applying the hydraulic braking force attributable to the hydraulic pressure to the vehicle. In addition, the acquisition device is capable of acquiring the input electric power value that shows the magnitude of the electric power which is input into the electric power supply. As a result, the vehicle is braked by using at least one of the regenerative braking force and the hydraulic braking force.

The vehicle control apparatus includes the electronic control device so as to control the vehicle. The electronic control device controls the regenerative device and the hydraulic device so as to adjust the ratios of the regenerative braking force and the hydraulic braking force to the required braking force. In particular, the electronic control device controls the regenerative device and the hydraulic device so as to adjust the ratios of the regenerative braking force and the hydraulic braking force based on the input electric power value that shows the magnitude of the electric power which is input into the electric power supply. In other words, the electronic control device controls the regenerative device and the hydraulic device so as to adjust the ratios of the regenerative braking force and the hydraulic braking force based on the input electric power value that shows the magnitude of the electric power which is supplied from the outside of the electric power supply toward the inside of the electric power supply. For example, the electronic control device may control the regenerative device and the hydraulic device so that the ratios of the regenerative braking force and the hydraulic braking force become ratios determined in accordance with the input electric power value.

As described above, the occurrence of a situation in which the electric power is output from the electric power supply despite the generation of the electric power by the regenerative electric power generation of the regenerative device may exacerbate the efficiency of the use of the electric power supply. Accordingly, it is preferable to suppress the occurrence of the situation in which the electric power is output from the electric power supply despite the generation of the electric power by the regenerative device so as to suppress the exacerbation in the efficiency of the use of the electric power supply. In order to suppress the occurrence of the situation in which the electric power is output from the electric power supply despite the generation of the electric power by the regenerative device, it is preferable for the regenerative device to stop the regenerative electric power generation (that is, to apply no regenerative braking force and to generate no electric power) before the occurrence of the situation in which the electric power is output from the electric power supply despite the generation of the electric power by the regenerative device.

By monitoring the input electric power value, the electronic control device can easily and directly determine whether or not the situation is occurring in which the electric power is output from the electric power supply. Accordingly, the electronic control device can adjust the ratios of the regenerative braking force and the hydraulic braking force so that the regenerative device stops the regenerative electric power generation before the occurrence of the situation in which the electric power is output from the electric power supply despite the generation of the electric power by the regenerative device. For example, the electronic control device can adjust, by monitoring the input electric power value, the ratios of the regenerative braking force and the hydraulic braking force so that the regenerative device stops the regenerative electric power generation before the input electric power value becomes zero or at the same time as the input electric power value becomes zero (that is, before the occurrence of the situation in which the electric power is output from the electric power supply despite the generation of the electric power by the regenerative device). As a result, the output of the electric power from the electric power supply during the regenerative electric power generation (that is, the exacerbation in the efficiency of the use of the electric power supply) is suppressed.

The electronic control device is capable of determining, by monitoring the input electric power value, whether or not the situation is occurring in which the electric power is output from the electric power supply, and thus can adjust the ratios of the regenerative braking force and the hydraulic braking force for the regenerative electric power generation to continue insofar as the electric power is input into the electric power supply or insofar as the electric power having a predetermined or larger amount is input into the electric power supply. As a result, the regenerative device is more likely to continue performing the regenerative electric power generation, while suppressing the occurrence of the situation in which the electric power is output from the electric power supply despite the generation of the electric power by the regenerative electric power generation, than in a case where the ratios of the regenerative braking force and the hydraulic braking force are adjusted without being based on the input electric power value. In other words, the regenerative device may not have to stop the regenerative electric power generation at an excessively early timing compared to a case where the ratios of the regenerative braking force and the hydraulic braking force are adjusted without being based on the input electric power value. As a result, the amount of the electric power that is input from the regenerative device to the electric power supply during the regenerative electric power generation increases correspondingly or relatively. In other words, an excessive decrease in the amount of the electric power that is input from the regenerative device to the electric power supply during the regenerative electric power generation is appropriately suppressed.

As described above, this vehicle control apparatus appropriately adjusts the ratios of the regenerative braking force and the hydraulic braking force based on the input electric power value, and thus can correspondingly or relatively increase the amount of the electric power that is input from the regenerative device to the electric power supply during the regenerative electric power generation while suppressing the output of the electric power from the electric power supply during the regenerative electric power generation. In other words, the vehicle control apparatus can achieve both the suppression of the output of the electric power from the electric power supply during the regenerative electric power generation and the suppression of an excessive decrease in the amount of the electric power that is input into the electric power supply from the regenerative device during the regenerative electric power generation.

In the vehicle control apparatus, the electronic control device may be configured to control the regenerative device and the hydraulic device such that the ratio of the regenerative braking force becomes zero in a case where the input electric power value satisfies a predetermined condition.

According to this vehicle control apparatus, the vehicle control apparatus is capable of changing the ratio of the regenerative braking force into zero such that the regenerative device stops the regenerative electric power generation in a case where the input electric power value satisfies the predetermined condition. As a result and for the reason described above, the vehicle control apparatus can correspondingly or relatively increase the amount of the electric power that is input into the electric power supply from the regenerative device during the regenerative electric power generation while suppressing the output of the electric power from the electric power supply during the regenerative electric power generation.

In the vehicle control apparatus, the electronic control device may be configured to control the regenerative device and the hydraulic device such that the ratio of the regenerative braking force becomes zero in a case where the input electric power value becomes equal to or less than a first predetermined amount, the first predetermined amount being equal to or greater than zero.

According to this vehicle control apparatus, the vehicle control apparatus is capable of allowing the ratio of the regenerative braking force to become zero so that the regenerative device stops the regenerative electric power generation in a case where the input electric power value becomes equal to or less than the first predetermined amount. Herein, since the first predetermined amount is at least zero, the vehicle control apparatus is capable of allowing the ratio of the regenerative braking force to become zero so that the regenerative device stops the regenerative electric power generation before the occurrence of the situation in which the electric power is output from the electric power supply despite the generation of the electric power by the regenerative device. As a result, the vehicle control apparatus can control the vehicle so as to suppress the output of the electric power from the electric power supply during the regenerative electric power generation (that is, the exacerbation in the efficiency of the use of the electric power supply). In addition, the vehicle control apparatus is capable of controlling the regenerative device so that the regenerative electric power generation continues insofar as the input electric power value is equal to or greater than the first predetermined amount (that is, insofar as the electric power that is equal to or greater than the first predetermined amount is input into the electric power supply). As a result, the vehicle control apparatus is capable of correspondingly or relatively increasing the amount of the electric power that is input into the electric power supply from the regenerative device during the regenerative electric power generation.

In the vehicle control apparatus, the electronic control device may be configured to control the regenerative device and the hydraulic device such that the ratio of the regenerative braking force becomes zero before the input electric power value becomes zero or at the same time as the input electric power value becomes zero.

According to this vehicle control apparatus, the vehicle control apparatus is capable of allowing the ratio of the regenerative braking force to become zero so that the regenerative device stops the regenerative electric power generation before the input electric power value becomes zero or at the same time as the input electric power value becomes zero. In other words, the vehicle control apparatus is capable of allowing the ratio of the regenerative braking force to become zero so that the regenerative device stops the regenerative electric power generation before the occurrence of the situation in which the electric power is output from the electric power supply despite the generation of the electric power by the regenerative device. As a result, the vehicle control apparatus is capable of suppressing the output of the electric power from the electric power supply during the regenerative electric power generation (that is, the exacerbation in the efficiency of the use of the electric power supply). In addition, the vehicle control apparatus is capable of controlling the regenerative device so that the regenerative electric power generation continues until the input electric power value becomes zero or reaches a certain value exceeding zero. As a result, the vehicle control apparatus is capable of correspondingly or relatively increasing the amount of the electric power that is input into the electric power supply from the regenerative device during the regenerative electric power generation.

In the vehicle control apparatus, the electronic control device may be configured to control the regenerative device and the hydraulic device such that the ratio of the regenerative braking force decreases as the input electric power value decreases.

According to this vehicle control apparatus, the vehicle control apparatus is capable of allowing the ratio of the regenerative braking force to become zero while gradually decreasing the ratio of the regenerative braking force (that is, while gradually increasing the ratio of the hydraulic braking force). Accordingly, deterioration in the braking performance of the vehicle or deterioration in the drivability of the vehicle attributable to a sudden change in the regenerative brake torque (for example, becoming zero all of a sudden) is suppressed.

In the vehicle control apparatus, the electronic control device may be configured to (i) control the regenerative device and the hydraulic device such that the ratio of the regenerative braking force becomes constant, regardless of the input electric power value, in a case where the input electric power value is equal to or greater than a second predetermined amount, and (ii) control the regenerative device and the hydraulic device such that the ratio of the regenerative braking force decreases as the input electric power value decreases in a case where the input electric power value is less than the second predetermined amount.

According to this vehicle control apparatus, the vehicle control apparatus is capable of correspondingly or relatively increasing the amount of the electric power that is input into the electric power supply from the regenerative device during the regenerative electric power generation while suppressing the output of the electric power from the electric power supply during the regenerative electric power generation.

Specifically, in a case where the input electric power value is relatively high (for example, in a case where the input electric power value is equal to or greater than the second predetermined amount), the situation in which the electric power is output from the electric power supply despite the generation of the electric power by the regenerative electric power generation of the regenerative device is relatively less likely to occur. Accordingly, in a case where the input electric power value is relatively high, the vehicle control apparatus maintains the ratio of the regenerative braking force to be constant (that is, does not decrease the ratio of the regenerative braking force) mainly for the purpose of maximizing the amount of the electric power that is input into the electric power supply from the regenerative device during the regenerative electric power generation.

In a case where the input electric power value is relatively low (for example, is less than the second predetermined amount), the situation in which the electric power is output from the electric power supply despite the generation of the electric power by the regenerative electric power generation of the regenerative device is relatively more likely to occur. Accordingly, in a case where the input electric power value is relatively low, the vehicle control apparatus decreases the ratio of the regenerative braking force (more preferably, allows the ratio of the regenerative braking force to become zero) as the input electric power value decreases mainly for the purpose of suppressing the output of the electric power from the electric power supply during the regenerative electric power generation. In addition, since the ratio of the regenerative braking force also gradually decreases (that is, the relatively large regenerative braking force rarely or never becomes zero all of a sudden) in accordance with the gradually decreasing input electric power value, deterioration in the braking performance of the vehicle or deterioration in the drivability of the vehicle attributable to a sudden change in the regenerative brake force (for example, becoming zero all of a sudden) is suppressed.

The first predetermined amount described above, as well as the second predetermined amount described in this aspect, are the predetermined amounts compared to the input electric power value. Typically, the second predetermined amount exceeds the first predetermined amount.

In the vehicle control apparatus, the electronic control device may be configured to control the regenerative device and the hydraulic device so as to adjust the ratio of the regenerative braking force based on the input electric power value and the required braking force.

According to this vehicle control apparatus, the vehicle control apparatus is capable of adjusting the ratio of the regenerative braking force so that it is possible to satisfy the required braking force. For example, the vehicle control apparatus described above is capable of adjusting the ratio of the regenerative braking force so that the required braking force is satisfied even when the ratio of the regenerative braking force is low (or zero).

Specifically, the ratio of the hydraulic braking force increases as the ratio of the regenerative braking force decreases. In a case where the required braking force is relatively large, the vehicle stops relatively earlier than in a case where the required braking force is relatively small. Accordingly, in a case where the required braking force is relatively large, it is preferable to advance the timing when the regenerative electric power generation stops compared to a case where the required braking force is relatively small. As a result, in a case where the required braking force is relatively large, the ratio of the regenerative braking force is required to be decreased at a relatively high speed (that is, the ratio of the hydraulic braking force is required to be increased at a relatively high speed) compared to a case where the required braking force is relatively small. However, the hydraulic braking force uses the hydraulic pressure, and thus it is difficult to increase the hydraulic braking force with rapidity. In addition, the adoption of a mechanism for increasing the hydraulic braking force with rapidity is not practical because this may lead to increased costs. Accordingly, as the required braking force increases, it becomes difficult to raise (that is, increase) the ratio of the hydraulic braking force at a rate of increase allowing the required braking force to be satisfied. In order to address the technical difficulties, the vehicle control apparatus can control the regenerative device and the hydraulic device so as to adjust the ratio of the regenerative braking force based on not only the input electric power value but also the required braking force (typically, the magnitude of the required braking force). Accordingly, the vehicle control apparatus described above is capable of increasing the ratio of the hydraulic braking force at a rate of increase allowing the required braking force to be satisfied while decreasing (in addition, to zero) the ratio of the regenerative braking force.

In the vehicle control apparatus that adjusts the ratio of the regenerative braking force based on the required braking force as described above, the electronic control device may be configured to control the regenerative device and the hydraulic device so that the timing when the ratio of the regenerative braking force begins to decrease is advanced as the required braking force increases.

According to this vehicle control apparatus, the vehicle control apparatus is capable of adjusting the ratio of the regenerative braking force so that the required braking force can be satisfied. For example, the vehicle control apparatus is capable of adjusting the ratio of the regenerative braking force so that the required braking force is satisfied even when the ratio of the regenerative braking force is decreased (or becomes zero).

Specifically, it is as described above that it becomes difficult to increase the ratio of the hydraulic braking force at a rate of increase allowing the required braking force to be satisfied as the required braking force increases. In order to address the technical difficulties, the vehicle control apparatus can adjust the ratio of the regenerative braking force so that the timing when the ratio of the regenerative braking force begins to decrease is advanced (that is, the timing when the ratio of the hydraulic braking force begins to increase is advanced) as the required braking force increases. Accordingly, a longer period of time allowed for increasing the ratio of the hydraulic braking force is ensured as the required braking force increases. Accordingly, even in a case where the required braking force increases, an excessive increase in the rate of increase of the ratio of the hydraulic braking force rarely or never occurs. As a result, the vehicle control apparatus can raise (increase) the ratio of the hydraulic braking force at a rate of increase allowing the required braking force to be satisfied even in a case where the required braking force is relatively large.

A third aspect of the invention provides a vehicle control apparatus including a regenerative device, an electric power supply, and an electronic control device. The regenerative device is configured to generate electric power by performing regenerative electric power generation. The electric power supply is configured to exchange electric power with the regenerative device. The electronic control device is configured to control the regenerative device so as to adjust the electric power generated by the regenerative device based on the input electric power value showing the magnitude of the electric power input into the electric power supply A fourth aspect of the invention provides a vehicle control apparatus including a regenerative device, an electric power supply, an acquisition device, and an electronic control device. The regenerative device is configured to generate electric power by performing regenerative electric power generation. The electric power supply is configured to exchange electric power with the regenerative device. The acquisition device is configured to acquire an input electric power value showing the magnitude of the electric power input into the electric power supply. The electronic control device is configured to control the regenerative device so as to adjust the electric power generated by the regenerative device based on the input electric power value showing the magnitude of the electric power input into the electric power supply.

According to this vehicle control apparatus, it is possible to control a vehicle including the regenerative device, the electric power supply, and the acquisition device or a vehicle including the regenerative device, the electric power supply, and the acquisition device. The regenerative device is capable of performing the regenerative electric power generation. In other words, the regenerative device is capable of generating electric power. It is preferable that the electric power supply accumulates (that is, stores) at least part of the electric power generated by the regenerative device by using, for example, an electric power storage device (described later). In addition, the regenerative device is capable of applying the regenerative braking force to the vehicle during the generation of the electric power since the regenerative device performs the regenerative electric power generation. In addition, the acquisition device is capable of acquiring the input electric power value that shows the magnitude of the electric power which is input into the electric power supply.

The vehicle control apparatus includes the electronic control device so as to control the vehicle. The electronic control device controls the regenerative device so as to adjust the electric power that is generated by the regenerative device (for example, to adjust the magnitude of the electric power that is generated by the regenerative device). In particular, the electronic control device controls the regenerative device so as to adjust the electric power that is generated by the regenerative device based on the input electric power value.

As a result, the vehicle control apparatus is capable of adjusting the electric power that is generated by the regenerative device so that the regenerative device stops the regenerative electric power generation (that is, the electric power that is generated by the regenerative device becomes zero) before the occurrence of the situation in which the electric power is output from the electric power supply despite the generation of the electric power by the regenerative device. As a result, the output of the electric power from the electric power supply during the regenerative electric power generation (that is, the exacerbation in the efficiency of the use of the electric power supply) is suppressed. In addition, the vehicle control apparatus can determine whether or not the state is occurring where the electric power is output from the electric power supply by monitoring the input electric power value, and thus can control the regenerative device so that the regenerative electric power generation is performed insofar as the electric power is input into the electric power supply. As a result, amount of the electric power that is input into the electric power supply from the regenerative device during the regenerative electric power generation increases compared to a case where the electric power that is generated by the regenerative device is adjusted without being based on the input electric power value.

As described above, the vehicle control apparatus is capable of correspondingly or relatively increasing the amount of the electric power that is input into the electric power supply from the regenerative device during the regenerative electric power generation while suppressing the output of the electric power from the electric power supply during the regenerative electric power generation by appropriately adjusting the electric power that is generated by the regenerative device based on the input electric power value.

The electronic control device may be configured to control the regenerative device so that the electric power that is generated by the regenerative device becomes zero in a case where the input electric power value satisfies a predetermined condition.

The electronic control device may be configured to control the regenerative device so that electric power that is generated by the regenerative device becomes zero in a case where the input electric power value becomes equal to or less than a first predetermined amount as an input electric power value exceeding zero.

The electronic control device may be configured to control the regenerative device so that the electric power that is generated by the regenerative device becomes zero before the input electric power value becomes zero or at the same time as the input electric power value becomes zero.

The electronic control device may be configured to control the regenerative device and the hydraulic device so that the electric power that is generated by the regenerative device decreases as the input electric power value decreases.

The electronic control device may be configured to control the regenerative device and the hydraulic device so as to adjust the electric power that is generated by the regenerative device by adjusting the ratios of the regenerative braking force and the hydraulic braking force based on the input electric power value separately from or regardless of the control based on an electric power limiting value (so-called Win) showing the upper limit value (that is, tolerance) of the electric power which can be input into the electric power supply.

In the vehicle control apparatus described above, the vehicle control apparatus may further include a hydraulic device applying a hydraulic braking force attributable to a hydraulic pressure. The regenerative device may be configured to generate electric power while applying a regenerative braking force by performing regenerative electric power generation. The electronic control device may be configured to control the regenerative device and the hydraulic device so as to adjust the electric power that is generated by the regenerative device by adjusting a ratio of the regenerative braking force and the hydraulic braking force to a required braking force required for the braking of the vehicle based on the input electric power value.

According to this vehicle control apparatus, the vehicle control apparatus can appropriately achieve various effects that can be achieved by the vehicle control apparatus described above. The vehicle control apparatus can appropriately adopt aspects that are similar to the various aspects which can be adopted by the vehicle control apparatus.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A is a graph illustrating an example of a regenerative brake ratio map that defines the association between a supply input electric power value and a regenerative brake ratio in the vehicle control apparatus according to the first embodiment;

FIG. 4B is a graph illustrating another example of the regenerative brake ratio map that defines the association between the supply input electric power value and the regenerative brake ratio in the vehicle control apparatus according to the first embodiment;

FIG. 4C is a graph illustrating yet another example of the regenerative brake ratio map that defines the association between the supply input electric power value and the regenerative brake ratio in the vehicle control apparatus according to the first embodiment;

FIG. 4D is a graph illustrating still yet another example of the regenerative brake ratio map that defines the association between the supply input electric power value and the regenerative brake ratio in the vehicle control apparatus according to the first embodiment;

DETAILED DESCRIPTION OF EMBODIMENTS

Hereinafter, embodiments of a vehicle control apparatus will be described.

Firstly, a vehicle 1 according to a first embodiment will be described with reference to FIGS. 1 to 6.

Figure 1:
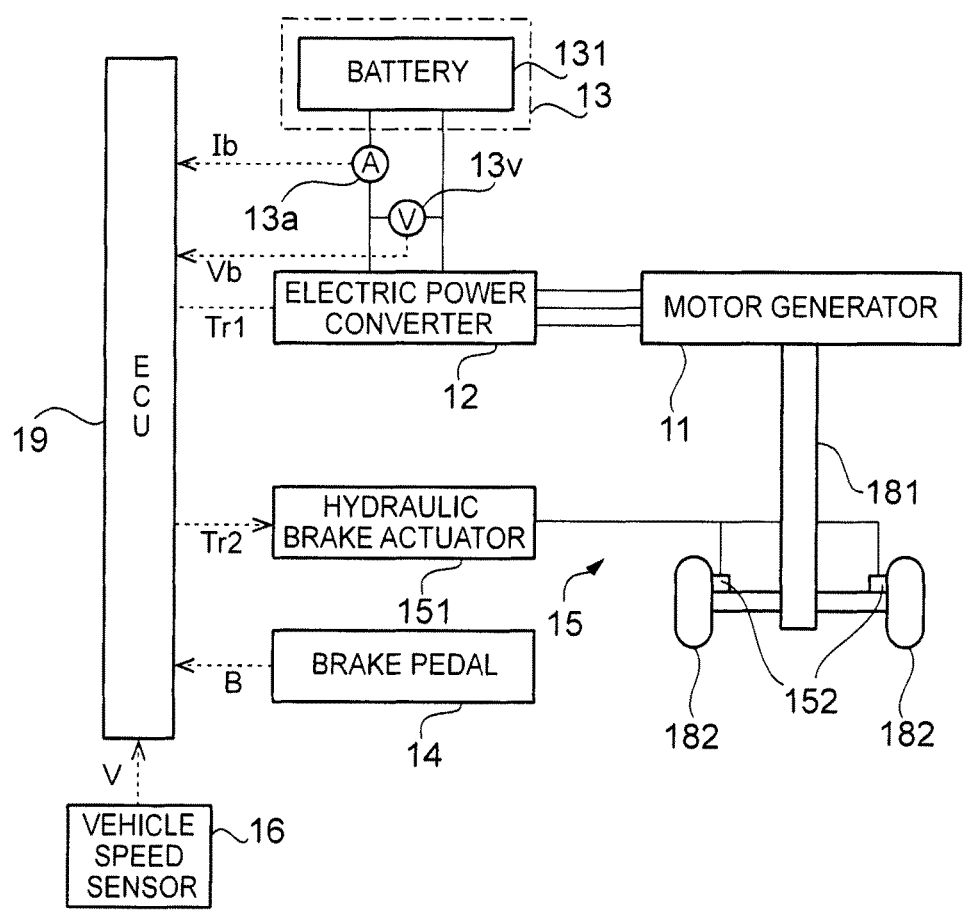
FIG. 1 is a block diagram illustrating the configuration of a vehicle according to a first embodiment of the invention.

The configuration of the vehicle 1 according to the first embodiment will be described with reference to FIG. 1. FIG. 1 is a block diagram illustrating an example of the configuration of the vehicle 1 according to the first embodiment.

As illustrated in FIG. 1, an vehicle control apparatus of the vehicle 1 is provided with a motor generator 11 that is an example of a "regenerative device", an electric power converter 12, an electric power supply 13 that is an example of an "electric power supply", a supply current sensor 13a, a supply voltage sensor 13v, a brake pedal 14, a hydraulic brake unit 15 that is an example of a "hydraulic device", a vehicle speed sensor 16, an axle 181, vehicle wheels 182, and an electronic control device (ECU) 19.

During powering, the motor generator 11 functions mainly as an electric motor that is driven by using the electric power that is output from the electric power supply 13 and supplies power (that is, power that is required for the traveling of the vehicle 1) to the axle 181 which is directly or indirectly connected to a rotating shaft of the motor generator 11. The power that is transmitted to the axle 181 is power for allowing the vehicle 1 to travel via the vehicle wheels 182.

During regeneration, the motor generator 11 functions mainly as an electric power generator for charging a battery 131 of the electric power supply 13. In this case, the motor generator 11 converts the kinetic energy of the vehicle 1 into electric energy by rotating the rotating shaft of the motor generator 11 by using the power that is transmitted from the axle 181. As a result, the motor generator 11 generates electric power. The electric power that is generated by the motor generator 11 is input into the electric power supply 13 via the electric power converter 12. As a result, the electric power that is generated by the motor generator 11 is stored in the battery 131 of the electric power supply 13. In this case, in addition, the motor generator 11 can brake the vehicle 1 (that is, apply the brakes on the vehicle 1) by applying a regenerative brake torque to the vehicle wheels 182. Accordingly, the motor generator 11 functions as a regenerative brake unit. The regenerative brake torque is an example of a "regenerative braking force".

The motor generator 11 may also function as an electric motor that supplies power to another drive mechanism in addition to or in place of functioning as the electric motor that supplies the power to the axle 181. In this case, the rotating shaft of the motor generator 11 may be directly or indirectly connected to the other drive mechanism (for example, a rotating shaft of a compressor of an air conditioner (described later), a crankshaft of an engine, or the like) in addition to or in place of the axle 181. For example, the motor generator 11 may function as an electric motor that supplies power to an auxiliary machine (for example, the compressor of the air conditioner) of the vehicle 1. In a case where the vehicle 1 is provided with the engine, for example, the motor generator 11 may function as an electric motor that starts the engine (so-called starter).

In addition, the motor generator 11 may function as an electric power generator that generates electric power by using the power that is transmitted from the other drive mechanism (for example, the engine) in addition to or in place of functioning as the electric power generator that generates the electric power by using the power which is transmitted from the axle 181. In this case, the rotating shaft of the motor generator 11 may be directly or indirectly connected to the other drive mechanism (for example, the crankshaft of the engine, or the like) in addition to or in place of the axle 181. In a case where the rotating shaft of the motor generator 11 is not connected to the axle 181, the motor generator 11 may not apply the regenerative brake torque to the vehicle wheels 182. Even in a case where the motor generator 11 does not apply the regenerative brake torque to the vehicle wheels 182, a torque that is similar to the regenerative brake torque is still generated in the rotating shaft of the motor generator 11 since the motor generator 11 generates electric power.

In addition, the motor generator 11 may not function as the electric motor while functioning as the electric power generator. The motor generator 11 may be a so-called alternator. In addition, the number of the motor generators 11 of the vehicle 1 may be two or more.

In addition, the vehicle 1 may be provided with the engine in addition to the motor generator 11. In a case where the vehicle 1 is provided with the engine, the rotating shaft of the motor generator 11 may be directly or indirectly connected to the crankshaft of the engine in addition to or in place of the axle 181. In a case where the vehicle 1 is provided with the engine, the vehicle 1 may be a series-type hybrid vehicle. In a case where the vehicle 1 is provided with the engine, the vehicle 1 may be a parallel-type hybrid vehicle. In a case where the vehicle 1 is provided with the engine, the vehicle 1 may be a split (power split) type hybrid vehicle.

During the powering, the electric power converter 12 converts the electric power that is output from the electric power supply 13 and supplies the converted electric power to the motor generator 11. During the regeneration, the electric power converter 12 converts the electric power that is generated by the motor generator 11 and supplies the converted electric power to the electric power supply 13.

It is preferable that the electric power converter 12 includes an inverter that is an example of the "regenerative device". During the powering, the inverter converts the electric power (DC electric power) that is output from the electric power supply 13 into AC electric power and supplies the converted electric power to the motor generator 11. In this case, a switching element of the inverter switches switching states under the control by the ECU 19 so that the output of the motor generator 11 becomes a desired output. During the regeneration, the inverter may convert the electric power (AC electric power) that is generated by the motor generator 11 into DC electric power and may supply the converted electric power to the electric power supply 13. In this case, the switching element of the inverter switches switching states under the control by the ECU 19 so that the regenerative brake torque which is applied by the motor generator 11 becomes a torque corresponding to a regenerative brake torque command value Tr1. As a result, the motor generator 11 generates electric power that has a magnitude corresponding to the regenerative brake torque and a vehicle speed V.

The electric power converter 12 may be provided with a boost converter that is arranged between the inverter and the electric power supply 13 in addition to the inverter. During the powering, the boost converter may boost the electric power that is output from the electric power supply 13. In this case, the inverter converts the electric power that is boosted by the boost converter. During the regeneration, the boost converter may step down the electric power that is output from the inverter. In this case, the electric power that has a voltage stepped down by the boost converter is supplied to the electric power supply 13.

During the powering, the electric power supply 13 outputs the electric power that is required for the motor generator 11 to function as the electric motor to the motor generator 11 via the electric power converter 12. During the regeneration, the electric power that is generated by the motor generator 11 which functions as the electric power generator is input from the motor generator 11 to the electric power supply 13 via the electric power converter 12.

The electric power supply 13 is provided with the battery 131. The battery 131 is a secondary battery that is capable of performing electric power output (that is, discharging) and electric power input (that is, charging). Examples of the battery include a lead storage battery, a lithium-ion battery, a nickel-hydrogen battery, and a fuel cell. The electric power supply 13 may be provided with a capacitor such as an electric double layer capacitor in addition to or in place of the battery 131.

The supply current sensor 13a detects a supply current value Ib that shows the magnitude of the current which flows between the electric power converter 12 and the electric power supply 13. Hereinafter, the supply current value Ib of the current that flows from the electric power converter 12 toward the electric power supply 13 is assumed to be positive (that is, the supply current value Ib of the current that flows from the electric power supply 13 toward the electric power converter 12 is assumed to be negative) for convenience of description. The supply current sensor 13a appropriately outputs the detected supply current value Ib to the ECU 19.

The supply voltage sensor 13v detects a supply voltage value Vb that shows the magnitude of the inter-terminal voltage of the electric power supply 13. In other words, the supply voltage sensor 13v detects the supply voltage value Vb that is the inter-terminal voltage of an electric power line between the electric power converter 12 and the electric power supply 13. The supply voltage sensor 13v appropriately outputs the detected supply voltage value Vb to the ECU 19.

The brake pedal 14 is an operation pedal that is operated by a driver of the vehicle 1. Typically, the driver operates the brake pedal 14 to be depressed in a case where the driver is to apply the brakes on the vehicle 1. The ECU 19 appropriately acquires a brake pedal operation amount B that is the amount of the operation of the brake pedal 14 (typically, the amount of depression).

The hydraulic brake unit 15 brakes the vehicle 1 by applying a hydraulic brake torque that is attributable to a hydraulic pressure to the vehicle wheels 182. The hydraulic brake torque is an example of a "hydraulic braking force". The hydraulic brake unit 15 is provided with a hydraulic brake actuator 151 and a hydraulic brake cylinder 152.

The hydraulic brake actuator 151 adjusts the hydraulic pressure of the hydraulic brake cylinder 152 so that the hydraulic brake cylinder 152 applies the hydraulic brake torque to the vehicle wheels 182. In particular, the hydraulic brake actuator 151 adjusts the hydraulic pressure of the hydraulic brake cylinder 152 so that the hydraulic brake torque that is applied by the hydraulic brake cylinder 152 becomes a torque corresponding to a hydraulic brake torque command value Tr2 which is calculated based on the brake pedal operation amount B.

The hydraulic brake cylinder 152 is a cylinder that has an inner portion filled with brake oil. The hydraulic pressure of the brake oil in the hydraulic brake cylinder 152 is adjusted by the hydraulic brake actuator 151. As a result, the hydraulic brake cylinder 152 applies the hydraulic brake torque corresponding to the hydraulic brake torque command value Tr2 to the vehicle wheels 182.

The vehicle speed sensor 16 detects the vehicle speed V of the vehicle 1. The vehicle speed sensor 16 appropriately outputs the detected vehicle speed V to the ECU 19.

The ECU 19 is an electronic control device that is configured to be capable of controlling the entire operation of the vehicle 1.

In the first embodiment in particular, the ECU 19 adjusts, during the regeneration, the electric power (typically, the magnitude of the electric power) that is generated by the motor generator 11 while maintaining a state where a required braking torque that is required for the braking of the vehicle 1 is applied to the vehicle 1. Specifically, the ECU 19 adjusts the electric power generated by the motor generator 11 by calculating the regenerative brake torque command value Tr1 that instructs the magnitude of the regenerative brake torque and controlling the motor generator 11 so that the regenerative brake torque corresponding to the regenerative brake torque command value Tr1 is applied to the vehicle 1. In addition, the ECU 19 maintains the state where the required braking torque is applied to the vehicle 1 (that is, a state where the sum total of the hydraulic brake torque and the regenerative brake torque is equal to the required braking torque) by controlling the hydraulic brake actuator 151 for the hydraulic brake torque to be applied to the vehicle 1 in addition to controlling the motor generator 11 for the regenerative brake torque to be applied to the vehicle 1. Specifically, the ECU 19 maintains the state where the required braking torque is applied to the vehicle 1 by calculating the hydraulic brake torque command value Tr2 that instructs the magnitude of the hydraulic brake torque and controlling the hydraulic brake actuator 151 so that the hydraulic brake torque corresponding to the hydraulic brake torque command value Tr2 is applied to the vehicle 1.

Figure 2A:
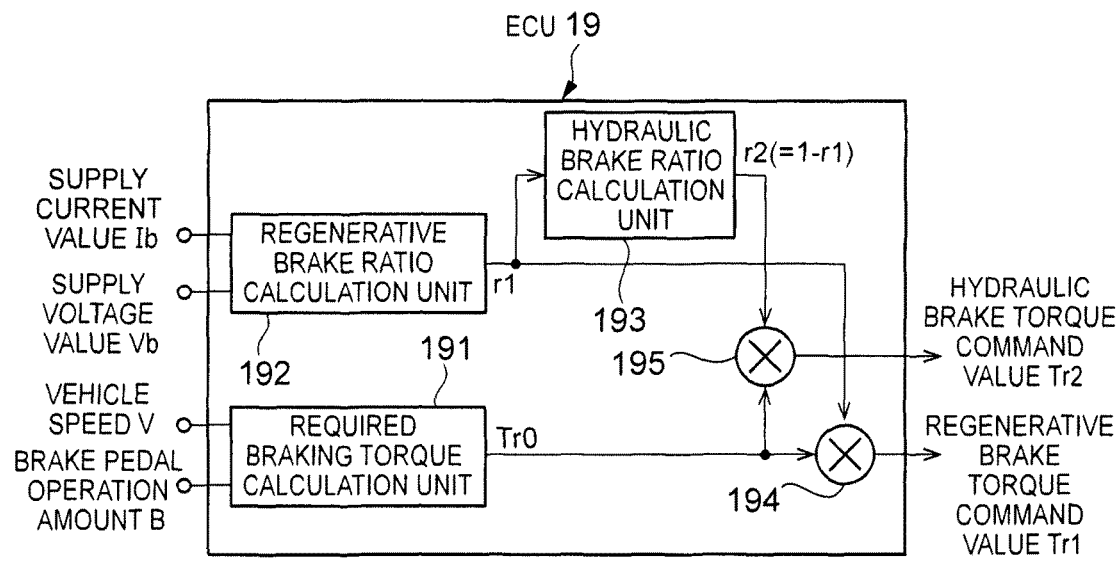
FIG. 2A is a block diagram illustrating the configuration of a processing block for regenerative brake torque and hydraulic brake torque calculation among the processing blocks that are logically realized in an electronic control device (ECU: hereinafter, referred to as an ECU) according to the first embodiment.
Figure 2B:
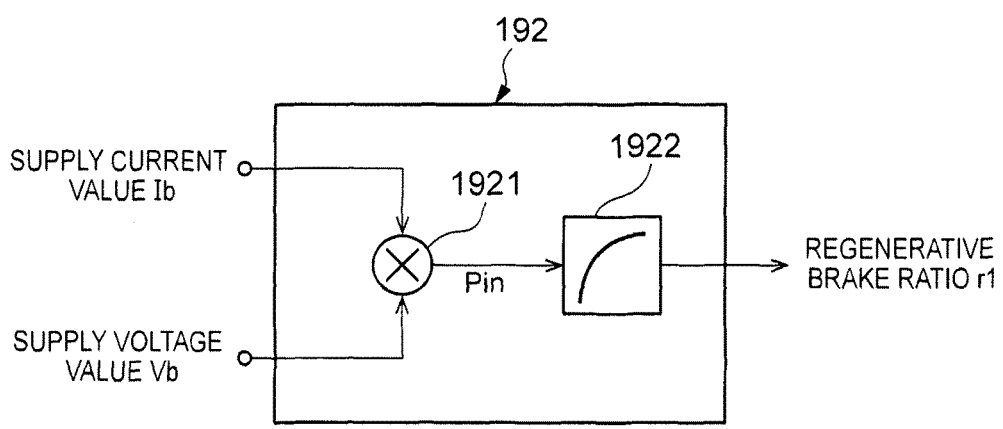
FIG. 2B is a block diagram illustrating the configuration of a regenerative brake ratio calculation unit of the ECU.

Hereinafter, a processing block for the calculation of the regenerative brake torque command value Tr1 and the hydraulic brake torque command value Tr2 among the processing blocks that are logically realized in the ECU 19 will be described with reference to FIGS. 2A and 2B. FIG. 2A is a block diagram illustrating the configuration of the processing block for the calculation of the regenerative brake torque command value Tr1 and the hydraulic brake torque command value Tr2 among the processing blocks that are logically realized in the ECU 19. FIG. 2B is a block diagram illustrating the configuration of a regenerative brake ratio calculation unit 192 of the ECU 19.

As illustrated in FIG. 2A, the ECU 19 is provided with a required braking torque calculation unit 191, the regenerative brake ratio calculation unit 192, a hydraulic brake ratio calculation unit 193, a multiplier 194, and a multiplier 195.

The required braking torque calculation unit 191 calculates a required braking torque command value Tr0 that instructs the magnitude of the required braking torque based on the vehicle speed V and the brake pedal operation amount B. For example, the required braking torque calculation unit 191 may calculate the required braking torque command value Tr0 by referring to a map that shows the association between the vehicle speed V and the brake pedal operation amount B, and the required braking torque command value Tr0.

The regenerative brake ratio calculation unit 192 calculates a regenerative brake ratio (that is, a ratio that is represented as regenerative brake torque/required braking torque) r1 that shows the ratio of the regenerative brake torque to the required braking torque. The regenerative brake ratio calculation unit 192 calculates the regenerative brake ratio r1 based on the supply current value Ib and the supply voltage value Vb. The regenerative brake ratio r1 is a numerical value ranging from zero to one (that is, a numerical value ranging from 0% to 100%).

More specifically, the regenerative brake ratio calculation unit 192 is provided with a multiplier 1921 and a map reference unit 1922 as illustrated in FIG. 2B.

The multiplier 1921 calculates a supply input electric power value Pin by multiplying the supply current value Ib by the supply voltage value Vb. The supply input electric power value Pin shows the magnitude of the electric power that is input from the electric power converter 12 to the electric power supply 13. In the first embodiment, the supply input electric power value Pin of the electric power that is input from the electric power converter 12 to the electric power supply 13 is assumed to be positive (that is, the supply input electric power value Pin of the electric power that is output from the electric power supply 13 to the electric power converter 12 is assumed to be negative).

The map reference unit 1922 calculates the regenerative brake ratio r1 based on the supply input electric power value Pin that is calculated by the multiplier 1921. Specifically, the map reference unit 1922 calculates the regenerative brake ratio r1 by referring to a regenerative brake ratio map that defines the association between the supply input electric power value Pin and the regenerative brake ratio r1.

Referring back to FIG. 2A, the hydraulic brake ratio calculation unit 193 calculates a hydraulic brake ratio r2 (=1−r1) that shows the ratio of the hydraulic brake torque to the required braking torque by subtracting the regenerative brake ratio r1, which is calculated by the regenerative brake ratio calculation unit 192, from one.

The multiplier 194 calculates the regenerative brake torque command value Tr1 by multiplying the regenerative brake ratio r1, which is calculated by the regenerative brake ratio calculation unit 192, by the required braking torque command value Tr0 that is calculated by the required braking torque calculation unit 191.

The multiplier 195 calculates the hydraulic brake torque command value Tr2 by multiplying the hydraulic brake ratio r2, which is calculated by the hydraulic brake ratio calculation unit 193, by the required braking torque command value Tr0 that is calculated by the required braking torque calculation unit 191.

Hereinafter, the flow of the operation for the calculation of the regenerative brake torque command value Tr1 and the hydraulic brake torque command value Tr2 that is performed by the ECU 19 which has the above-described configuration will be described in further detail.

Figure 3:
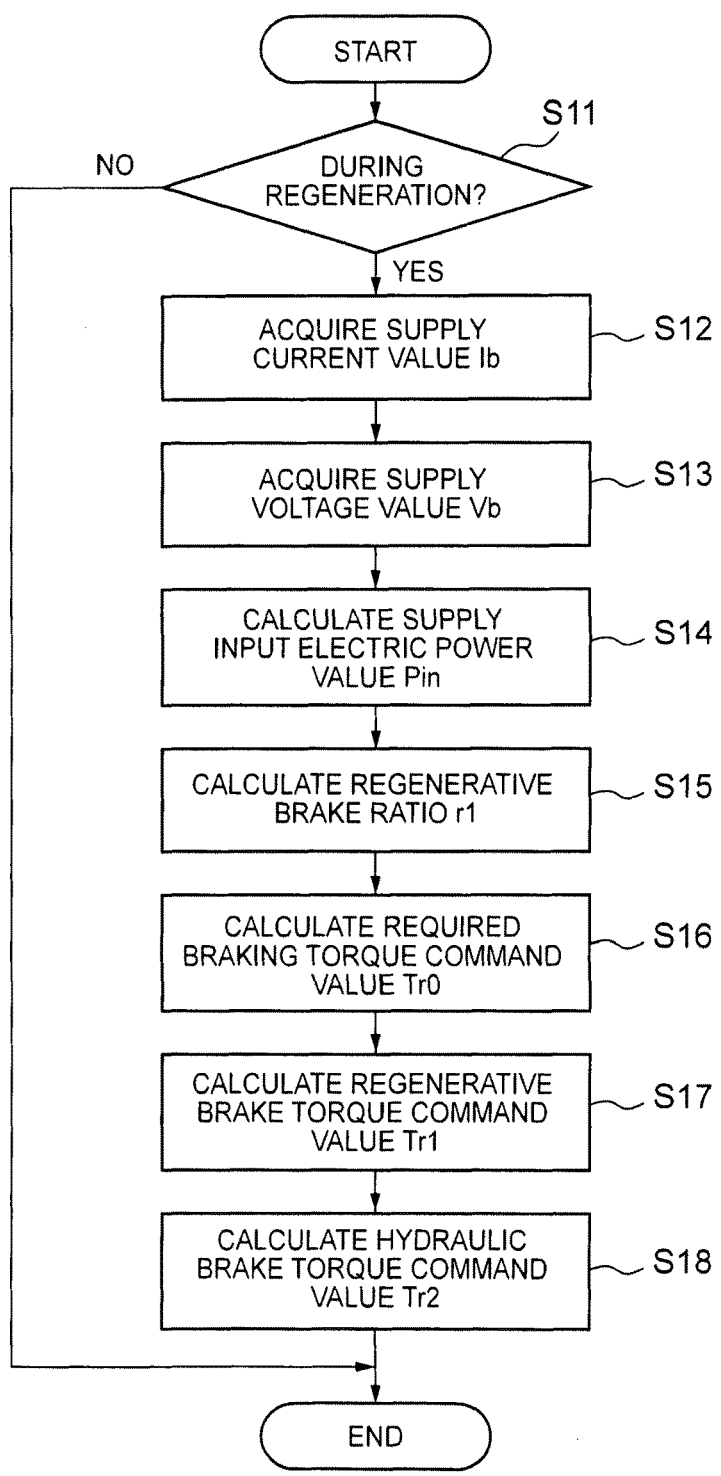
FIG. 3 is a flowchart illustrating the flow of the regenerative brake torque command value and hydraulic brake torque command value calculation operation that is performed by the ECU in a vehicle control apparatus according to the first embodiment.

The flow of the operation for the calculation of the regenerative brake torque command value Tr1 and the hydraulic brake torque command value Tr2 that is performed by the ECU 19 will be described with reference to FIG. 3. FIG. 3 is a flowchart illustrating the flow of the operation for the calculation of the regenerative brake torque command value Tr1 and the hydraulic brake torque command value Tr2 that is performed by the ECU 19. The ECU 19 may perform the operation for the calculation of the regenerative brake torque command value Tr1 and the hydraulic brake torque command value Tr2 that is illustrated in FIG. 3 periodically or at any time.

As illustrated in FIG. 3, the ECU 19 determines whether or not the vehicle 1 is in a condition during regeneration (Step S11).

In a case where it is determined that the vehicle 1 is not in a condition during regeneration as a result of the determination of Step S11 (Step S11: No), the ECU 19 may not calculate the regenerative brake torque command value Tr1 and the hydraulic brake torque command value Tr2. In this case, the ECU 19 may terminate the operation.

In a case where it is determined that the vehicle 1 is in a condition during regeneration as a result of the determination of Step S11 (Step S11: Yes), the ECU 19 calculates the regenerative brake ratio r1 that shows the ratio of the regenerative brake torque to the required braking torque by performing the operations of Step S12 to Step S15. Specifically, the regenerative brake ratio calculation unit 192 of the ECU 19 acquires the supply current value Ib from the supply current sensor 13a (Step S12). In addition, the regenerative brake ratio calculation unit 192 acquires the supply voltage value Vb from the supply voltage sensor 13v (Step S13). Then, the regenerative brake ratio calculation unit 192 calculates the supply input electric power value Pin by multiplying the supply current value Ib that is acquired in Step S12 by the supply voltage value Vb that is acquired in Step S13 by using the multiplier 1921 (Step S14). Then, the regenerative brake ratio calculation unit 192 calculates the regenerative brake ratio r1 (Step S15) based on the supply input electric power value Pin that is calculated in Step S14. Specifically, the map reference unit 1922 of the regenerative brake ratio calculation unit 192 calculates the regenerative brake ratio r1 by referring to the regenerative brake ratio map that defines the association between the supply input electric power value Pin and the regenerative brake ratio r1.

Hereinafter, the regenerative brake ratio map that defines the association between the supply input electric power value Pin and the regenerative brake ratio r1 will be described with reference to FIGS. 4A to 4D. Each of FIGS. 4A to 4D is a graph illustrating an example of the regenerative brake ratio map that defines the association between the supply input electric power value Pin and the regenerative brake ratio r1.

As illustrated in FIG. 4A, the regenerative brake ratio r1 is fixed at one (that is, 100%), regardless of the magnitude of the supply input electric power value Pin, in a first area where the supply input electric power value Pin exceeds a predetermined threshold TH1 (TH1>0). Accordingly, the entire required braking torque is shared by the regenerative brake torque in a case where the supply input electric power value Pin exceeds the predetermined threshold TH1. In other words, the hydraulic brake torque is not applied to the vehicle 1 in a case where the supply input electric power value Pin is equal to or greater than the predetermined threshold TH1. The predetermined threshold TH1 is an example of a "first predetermined amount".

The regenerative brake ratio r1 decreases as the supply input electric power value Pin decreases in a second area where the supply input electric power value Pin is equal to or less than the predetermined threshold TH1 and exceeds zero. FIG. 4A illustrates an example in which the supply input electric power value Pin and the regenerative brake ratio r1 have a linear relationship (that is, the relationship can be expressed by a linear function). Accordingly, part of the required braking torque is shared by the regenerative brake torque and the other part of the required braking torque is shared by the hydraulic brake torque in a case where the supply input electric power value Pin is equal to or less than the predetermined threshold TH1 and exceeds zero.

The regenerative brake ratio r1 is fixed at zero (that is, 0%), regardless of the magnitude of the supply input electric power value Pin, in a third area where the supply input electric power value Pin does not exceed zero. Accordingly, the entire required braking torque is shared by the hydraulic brake torque in a case where the supply input electric power value Pin does not exceed zero. In other words, the regenerative brake torque is not applied to the vehicle 1 (that is, the electric power that is generated by the motor generator 11 is zero) in a case where the supply input electric power value Pin does not exceed zero. The zero is an example of a "second predetermined amount".

The regenerative brake ratio map that is illustrated in FIG. 4A is an example. Accordingly, a brake ratio map that is different from the regenerative brake ratio maps that are illustrated in FIGS. 4A to 4D may also be used. For example, the regenerative brake ratio r1 may be fixed at a constant value exceeded by one, regardless of the magnitude of the supply input electric power value Pin, in the first area where the supply input electric power value Pin is equal to or greater than the predetermined threshold TH1 as illustrated in FIG. 4B. For example, the supply input electric power value Pin and the regenerative brake ratio r1 may have a non-linear relationship in the second area where the supply input electric power value Pin is less than the predetermined threshold TH1 and exceeds zero as illustrated in FIG. 4C. For example, the second area where the regenerative brake ratio r1 decreases as the supply input electric power value Pin decreases may be an area where the supply input electric power value Pin is equal to or less than the predetermined threshold TH1 and exceeds a predetermined threshold TH2 (0<TH2<TH1, the predetermined threshold TH2 being an example of the "second predetermined amount") as illustrated in FIG. 4D. In this case, the third area where the regenerative brake ratio r1 is fixed at zero regardless of the magnitude of the supply input electric power value Pin as illustrated in FIG. 4D may be an area where the supply input electric power value Pin is equal to or less than the predetermined threshold TH2.

Referring back to FIG. 3, the calculation of the required braking torque command value Tr0 by the ECU 19 (Step S16) follows, in tandem or in parallel, the operation for the calculation of the regenerative brake ratio r1 that is illustrated in Step S12 to Step S15. Specifically, the required braking torque calculation unit 191 of the ECU 19 calculates the required braking torque command value Tr0 based on the vehicle speed V and the brake pedal operation amount B and by referring to a required braking torque map that shows the association between the vehicle speed V and the brake pedal operation amount B, and the required braking torque command value Tr0. Typically, a required braking torque map in which the required braking torque command value Tr0 increases as the vehicle speed V increases is used. Typically, in addition, a required braking torque map is used in which the required braking torque command value Tr0 increases as the brake pedal operation amount B increases in an area where the brake pedal operation amount B is exceeded by a predetermined operation amount and the required braking torque command value Tr0 is fixed at a constant value regardless of the magnitude of the brake pedal operation amount B in an area where the brake pedal operation amount B is equal to or greater than the predetermined operation amount.

Then, the ECU 19 calculates the regenerative brake torque command value Tr1 (Step S17). Specifically, the ECU 19 calculates the regenerative brake torque command value Tr1 by multiplying the regenerative brake ratio r1 that is calculated in Step S15 by the required braking torque command value Tr0 that is calculated in Step S16 by using the multiplier 194. In other words, the ECU 19 calculates the regenerative brake torque command value Tr1 based on the mathematical formula of regenerative brake torque command value Tr1=required braking torque command value Tr0×regenerative brake ratio r1.

The calculation of the hydraulic brake torque command value Tr2 by the ECU 19 (Step S18) follows, in tandem or in parallel, the operation for the calculation of the regenerative brake torque command value Tr1 that is illustrated in Step S17. Specifically, the hydraulic brake ratio calculation unit 193 of the ECU 19 calculates the hydraulic brake ratio r2 by subtracting the regenerative brake ratio r1, which is calculated in Step S15, from one. Then, the ECU 19 calculates the hydraulic brake torque command value Tr2 by multiplying the hydraulic brake ratio r2 by the required braking torque command value Tr0 calculated in Step S16 by using the multiplier 195. In other words, the ECU 19 calculates the hydraulic brake torque command value Tr2 based on the mathematical formula of hydraulic brake torque command value Tr2=required braking torque command value Tr0×hydraulic brake ratio r2.

Then, the ECU 19 controls the inverter of the electric power converter 12, although not illustrated in the flowchart illustrated in FIG. 3, so that the regenerative brake torque corresponding to the regenerative brake torque command value Tr1 that is calculated in Step S17 is applied to the vehicle 1 by the motor generator 11. In this case, the switching element of the inverter switches switching states so that the regenerative brake torque that is applied to the vehicle 1 by the motor generator 11 becomes a torque corresponding to the regenerative brake torque command value Tr1. As a result, the regenerative brake torque corresponding to the regenerative brake torque command value Tr1 is applied to the vehicle 1. In addition, the motor generator 11 can generate electric power that has a magnitude corresponding to the regenerative brake torque which is applied to the vehicle 1 (typically, electric power that has a magnitude corresponding to regenerative brake torque×rotation speed of the motor generator 11).

Although not illustrated in the flowchart illustrated in FIG. 3, the ECU 19 controls the hydraulic brake actuator 151 so that the hydraulic brake torque corresponding to the hydraulic brake torque command value Tr2 that is calculated in Step S18 is applied to the vehicle 1 by the hydraulic brake unit 15. In this case, the hydraulic brake actuator 151 adjusts the hydraulic pressure of the hydraulic brake cylinder 152 so that the hydraulic brake torque that is applied to the vehicle 1 by the hydraulic brake cylinder 152 becomes a torque corresponding to the hydraulic brake torque command value Tr2. As a result, the hydraulic brake torque corresponding to the hydraulic brake torque command value Tr2 is applied to the vehicle 1.

As described above, the ECU 19 in the first embodiment calculates the regenerative brake torque command value Tr1 and the hydraulic brake torque command value Tr2 based on the supply input electric power value Pin. In other words, in the first embodiment, the regenerative brake torque and the hydraulic brake torque determined in accordance with the supply input electric power value Pin are applied to the vehicle 1. As a result, the ECU 19 can control the vehicle 1 so that the amount of the electric power that is input into the electric power supply 13 during the regeneration increases correspondingly or relatively while the output of the electric power from the electric power supply 13 during the regeneration is suppressed. In other words, the ECU 19 can control the vehicle 1 to achieve both the suppression of the output of the electric power from the electric power supply 13 during the regeneration and the suppression of an excessive decrease in the amount of the electric power that is input into the electric power supply 13 during the regeneration. Hereinafter, the electric power that is generated by the motor generator 11 will be referred to as "regenerative electric power" and the integrated amount of the regenerative electric power will be referred to as a "regenerative electric power amount" for convenience of description.

Figure 5:
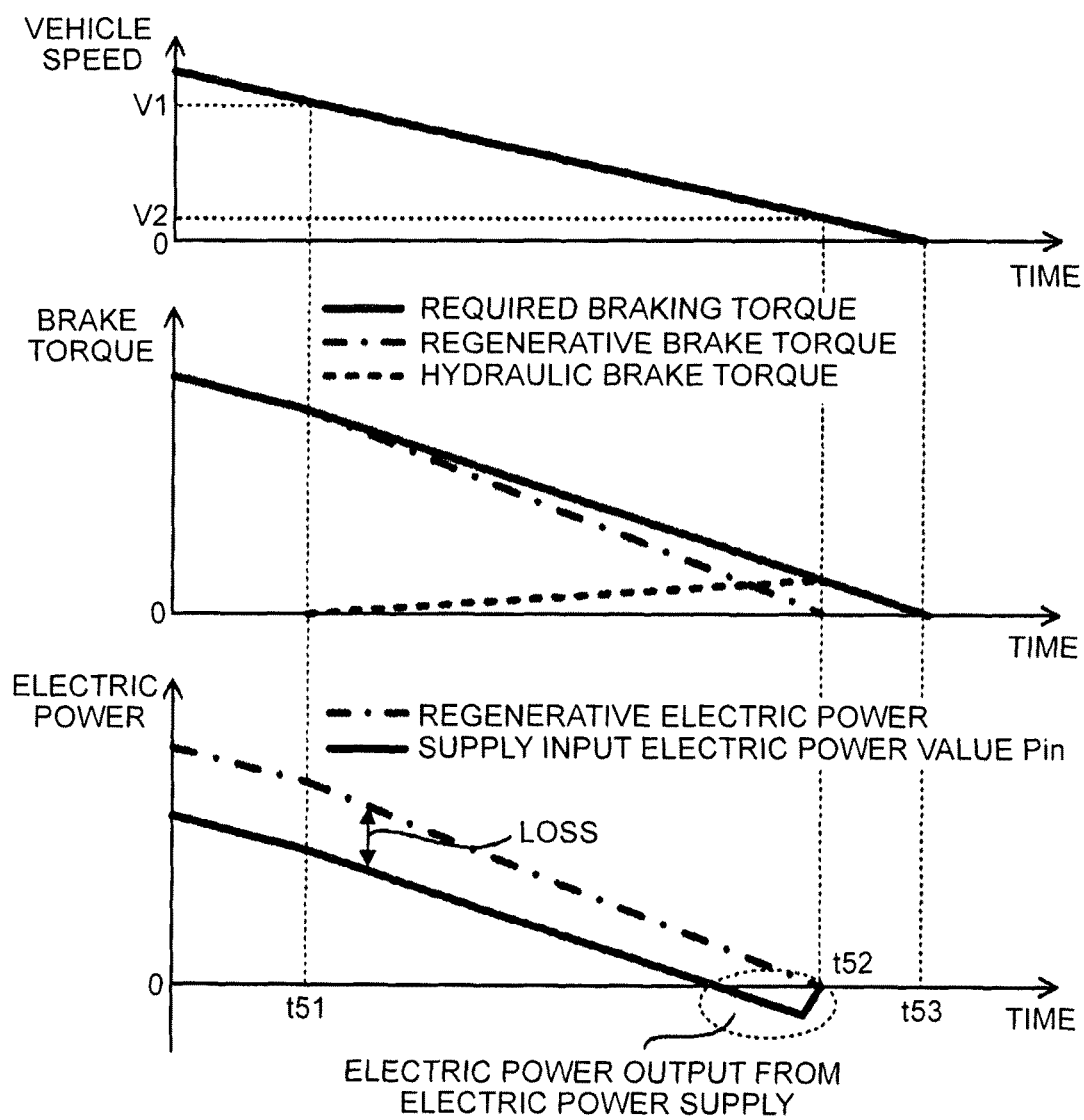
FIG. 5 is a timing chart illustrating a time-dependent relationship between a vehicle speed, a required braking torque, a regenerative brake torque, and a hydraulic brake torque, and regenerative electric power and a supply input electric power value according to a comparative example of the first embodiment.
Figure 6:
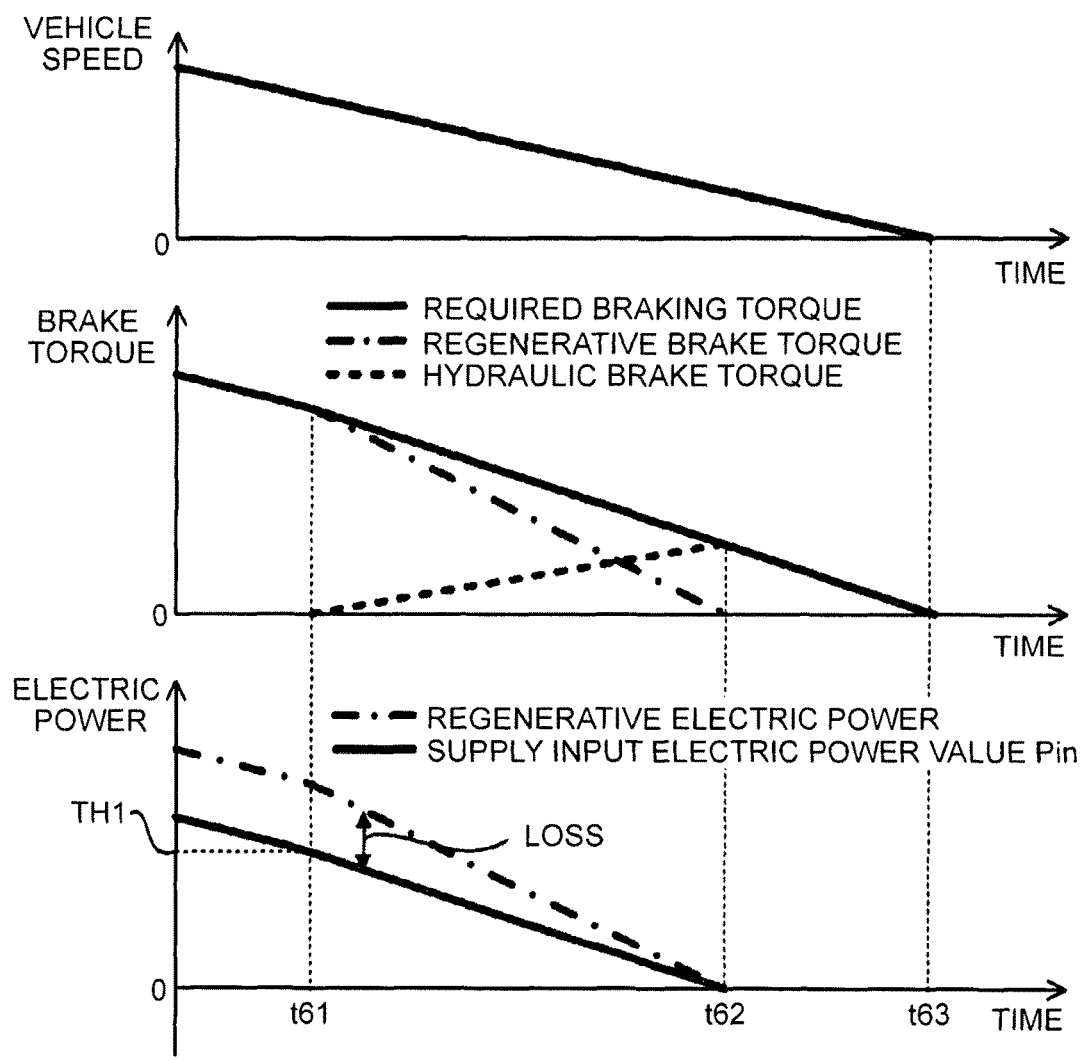
FIG. 6 is a timing chart illustrating a time-dependent relationship between a vehicle speed, a required braking torque, a regenerative brake torque, and a hydraulic brake torque, and regenerative electric power and the supply input electric power value according to the vehicle control apparatus of the first embodiment.

Hereinafter, the reason for the technical effect in which the amount of the electric power that is input into the electric power supply 13 during the regeneration increases correspondingly or relatively while the output of the electric power from the electric power supply 13 during the regeneration is suppressed will be described with reference to FIGS. 5 and 6. For convenience of description, the technical effect will be described in comparison to a comparative example in which the regenerative brake torque and the hydraulic brake torque determined in accordance with the supply input electric power value Pin are not applied to the vehicle 1 (specifically, the regenerative brake torque and the hydraulic brake torque determined in accordance with the vehicle speed V are applied to the vehicle 1). FIG. 5 is a timing chart illustrating a time-dependent relationship between the vehicle speed V, a required braking torque, a regenerative brake torque, and a hydraulic brake torque, and regenerative electric power and the supply input electric power value Pin according to the comparative example. FIG. 6 is a timing chart illustrating a time-dependent relationship between the vehicle speed V, the required braking torque, the regenerative brake torque, and the hydraulic brake torque, and the regenerative electric power and the supply input electric power value Pin according to the first embodiment.

In the comparative example, the regenerative brake ratio r1 is calculated in accordance with the vehicle speed V. In other words, in the comparative example, the regenerative brake torque is a torque corresponding to the vehicle speed V. Specifically, in the comparative example, the regenerative brake ratio r1 is fixed at one in a case where the vehicle speed V exceeds a predetermined speed V1 (V1>0). In the comparative example, the regenerative brake ratio r1 decreases as the vehicle speed V decreases in a case where the vehicle speed V is equal to or less than the predetermined speed V1 and exceeds a predetermined speed V2 (0.2≤V1). In the comparative example, the regenerative brake ratio r1 is fixed at zero in a case where the vehicle speed V is equal to or less than the predetermined speed V2. The operation of the comparative example other than the method for calculating the regenerative brake ratio r1 described above may be similar to the operation of the first embodiment described above.

In this case, the entire required braking torque is shared by the regenerative brake torque in a case where the vehicle speed V exceeds the predetermined speed V1 as illustrated in the graph in the middle of FIG. 5. Accordingly, the hydraulic brake torque is not applied to the vehicle 1 in a case where the vehicle speed V exceeds the predetermined speed V1.

In a case where the regenerative brake torque is applied to the vehicle 1, the motor generator 11 generates the regenerative electric power corresponding to the regenerative brake torque and the rotation speed of the motor generator 11 (substantially, the vehicle speed V).

The regenerative electric power is input into the electric power supply 13. However, at least part of the regenerative electric power becomes a loss that is attributable to the motor generator 11 itself (for example, iron loss and copper loss). In addition, at least part of the regenerative electric power becomes a loss that is attributable to the electric power converter 12 (for example, inverter loss and converter loss and, typically, switching loss). Accordingly, at least part of the regenerative electric power is not input into the electric power supply 13. In other words, the supply input electric power value Pin becomes less than the regenerative electric power as illustrated in the graph in the bottom of FIG. 5.

Then, part of the required braking torque is shared by the regenerative brake torque and the other part of the required braking torque is shared by the hydraulic brake torque when the vehicle speed V becomes equal to or less than the predetermined speed V1 at time t51. As a result, for example, the regenerative brake torque gradually decreases and the hydraulic brake torque gradually increases.

Then, the entire required braking torque is shared by the hydraulic brake torque when the vehicle speed V becomes equal to or less than the predetermined speed V2 at time t52. Accordingly, the regenerative brake torque is not applied to the vehicle 1 in a case where the vehicle speed V becomes equal to or less than the predetermined speed V2. In other words, the regenerative brake torque is applied to the vehicle 1 until immediately before the vehicle speed V becomes equal to or less than the predetermined speed V2. Accordingly, the motor generator 11 generates the regenerative electric power corresponding in amount to the regenerative brake torque and the rotation speed of the motor generator 11 (substantially, the vehicle speed V) until immediately before the vehicle speed V becomes equal to or less than the predetermined speed V2.

Then, the vehicle speed V becomes zero at time t53. In other words, the vehicle 1 stops.

A method for increasing the regenerative electric power amount is one of the methods for increasing the amount of the electric power that is input into the electric power supply 13 during the regeneration. Examination of the method for increasing the regenerative electric power amount shows that the length of the period during which the motor generator 11 can generate the regenerative electric power increases as the timing when the regenerative brake torque becomes zero is retarded. In other words, the regenerative electric power amount increases as the timing when the regenerative brake torque becomes zero is retarded. Then, it is considered that the predetermined speed V2 that defines the timing when the regenerative brake torque becomes zero (that is, the regeneration stops) should be decreased to the minimum for the regenerative electric power amount to be increased to the maximum.

In a state where the vehicle speed V is relatively low, however, the regenerative brake torque is also relatively small, and thus the regenerative electric power is also relatively small. Then, in view of at least part of the regenerative electric power becoming a loss, the supply input electric power value Pin may become less than zero despite the regenerative electric power exceeding zero as illustrated in the graph in the bottom of FIG. 5 in a state where vehicle speed V is relatively low. In other words, the electric power supply 13 may have to output electric power (for example, the electric power converter 12 may be driven by using the electric power that is output from the electric power supply 13) despite the motor generator 11 generating the regenerative electric power. In other words, the regenerative electric power may not be used in the charging of the battery 131 and the battery 131 may be discharged despite the charging of the battery 131 being the main purpose of the generation of the regenerative electric power by the motor generator 11. It cannot be said that the situation in which the electric power supply 13 outputs electric power regardless of the generation of the regenerative electric power by the motor generator 11 is preferable because the situation may exacerbate the efficiency of the use of the electric power supply 13.

If the timing when the regenerative brake torque becomes zero is relatively advanced, the occurrence of the situation itself in which the electric power supply 13 outputs electric power regardless of the generation of the regenerative electric power by the motor generator 11 can be suppressed. In other words, the occurrence of the situation itself in which the electric power supply 13 outputs electric power regardless of the generation of the regenerative electric power by the motor generator 11 can be suppressed if the predetermined speed V2 that defines the timing when the regenerative brake torque becomes zero (that is, the regeneration stops) is relatively high. However, the timing when the regenerative brake torque becomes zero is advanced as the predetermined speed V2 increases, and thus the regenerative electric power amount may excessively decrease. As a result, the amount of the electric power that is input into the electric power supply 13 during the regeneration may excessively decrease as well.

In the comparative example in which the regenerative brake torque and the hydraulic brake torque determined in accordance with the vehicle speed V are applied to the vehicle 1 as described above, it is difficult to control the vehicle 1 so that the amount of the electric power that is input into the electric power supply 13 during the regeneration increases correspondingly or relatively while the output of the electric power from the electric power supply 13 during the regeneration is suppressed.

The first embodiment is contrary to the comparative example in that the regenerative brake torque and the hydraulic brake torque determined in accordance with the supply input electric power value Pin are applied to the vehicle 1. As illustrated in FIG. 6, for example, the regenerative brake ratio r1 is fixed at one in a case where the supply input electric power value Pin exceeds the predetermined threshold TH1. Accordingly, the entire required braking torque is shared by the regenerative brake torque. Accordingly, the hydraulic brake torque is not applied to the vehicle 1 in a case where the supply input electric power value Pin exceeds the predetermined threshold TH1.

Then, the regenerative brake ratio r1 decreases as the supply input electric power value Pin decreases when the supply input electric power value Pin becomes equal to or less than the predetermined threshold TH1 at time t61. Accordingly, part of the required braking torque is shared by the regenerative brake torque and the other part of the required braking torque is shared by the hydraulic brake torque. As a result, for example, the regenerative brake torque gradually decreases and the hydraulic brake torque gradually increases.

Then, the regenerative brake ratio r1 is fixed at zero when the supply input electric power value Pin becomes zero at time t62. In other words, at time t62, the supply input electric power value Pin becomes zero and the regenerative brake ratio r1 becomes zero at the same time. Accordingly, the entire required braking torque is shared by the hydraulic brake torque. Accordingly, the regenerative brake torque is not applied to the vehicle 1 in a case where the supply input electric power value Pin becomes zero. In other words, the regenerative brake torque is applied to the vehicle 1 until immediately before the supply input electric power value Pin becomes zero. Accordingly, the motor generator 11 generates the regenerative electric power corresponding in amount to the regenerative brake torque and the rotation speed of the motor generator 11 (substantially, the vehicle speed V) until immediately before the supply input electric power value Pin becomes zero.

Then, the vehicle speed V becomes zero at time t63. In other words, the vehicle 1 stops.

As described above, in the first embodiment, the motor generator 11 can apply the regenerative brake torque to the vehicle 1 until immediately before the supply input electric power value Pin becomes zero, and the regenerative brake torque can become zero and the supply input electric power value Pin can become zero at the same time. In other words, the motor generator 11 can generate the regenerative electric power until immediately before the supply input electric power value Pin becomes zero and can stop the generation of the regenerative electric power simultaneously when the supply input electric power value Pin becomes zero. In other words, in the first embodiment, the situation rarely or never occurs in which the supply input electric power value Pin becomes less than zero despite the regenerative electric power exceeding zero as illustrated in the graph in the bottom of FIG. 6. In other words, in the first embodiment, the situation rarely or never occurs in which the electric power supply 13 outputs electric power regardless of the generation of the regenerative electric power by the motor generator 11. Accordingly, exacerbation in the efficiency of the use of the electric power supply 13 is appropriately suppressed.

In addition, in the first embodiment, the motor generator 11 can generate the regenerative electric power until immediately before the supply input electric power value Pin becomes zero. In other words, the motor generator 11 can continue generating the regenerative electric power for as long as possible while suppressing the occurrence of the situation in which the electric power supply 13 outputs electric power regardless of the generation of the regenerative electric power by the motor generator 11. In other words, a situation rarely or never occurs in which the timing when the regenerative brake torque becomes zero (that is, the regenerative electric power becomes zero) is excessively advanced. In other words, in the first embodiment illustrated in the bottom of FIG. 6, a situation rarely or never occurs in which the generation of the regenerative electric power is stopped at an excessively early timing as the motor generator 11 adheres excessively to the suppression of the occurrence of the situation in which the electric power supply 13 outputs electric power regardless of the generation of the regenerative electric power by the motor generator 11. Accordingly, an excessive decrease in the regenerative electric power amount rarely or never occurs. As a result, an excessive decrease in the amount of the electric power that is input into the electric power supply 13 during the regeneration is appropriately suppressed.

As described above, the ECU 19 of the first embodiment can control the vehicle 1 so that the amount of the electric power that is input into the electric power supply 13 during the regeneration increases correspondingly or relatively while the output of the electric power from the electric power supply 13 during the regeneration is suppressed. In other words, the ECU 19 can control the vehicle 1 to achieve both the suppression of the output of the electric power from the electric power supply 13 during the regeneration and the suppression of an excessive decrease in the amount of the electric power that is input into the electric power supply 13 during the regeneration.

In addition, in the first embodiment, the regenerative brake ratio r1 that is calculated by the ECU 19 decreases as the supply input electric power value Pin decreases. In other words, the ECU 19 can ultimately change the regenerative brake ratio r1 to zero while gradually decreasing the regenerative brake ratio r1 (that is, while gradually increasing the hydraulic brake ratio r2). Accordingly, a significant change in the required braking torque that is applied to the vehicle 1 rarely or never occurs even in a case where the regenerative brake ratio r1 changes. Accordingly, deterioration in the braking performance of the vehicle 1 or deterioration in the drivability of the vehicle 1 attributable to a change in the regenerative brake torque (for example, a sudden change) is suppressed.

According to the above description, the motor generator 11 generates the regenerative electric power corresponding in amount to the regenerative brake torque until immediately before the supply input electric power value Pin becomes zero. This is because the supply input electric power value Pin becomes zero and the regenerative brake ratio r1 becomes zero at the same time as illustrated in FIG. 4A. As described with reference to FIG. 4D, it is as described above that the regenerative brake ratio r1 may be fixed at zero, even in the first embodiment, in a case where the supply input electric power value Pin becomes equal to or less than the predetermined threshold TH2 (TH2>0). In a case where the supply input electric power value Pin becomes equal to or less than the predetermined threshold TH2 and the regenerative brake ratio r1 is fixed at zero, the motor generator 11 generates the regenerative electric power corresponding in amount to the regenerative brake torque until immediately before the supply input electric power value Pin reaches the predetermined threshold TH2. In other words, in a case where the supply input electric power value Pin becomes equal to or less than the predetermined threshold TH2 and the regenerative brake ratio r1 is fixed at zero, the regenerative electric power amount itself is smaller than in a case where the supply input electric power value Pin becomes zero and the regenerative brake ratio r1 becomes zero at the same time.

However, the regenerative brake ratio r1 (that is, the regenerative brake torque) is calculated based on the supply input electric power value Pin. Accordingly, an excessive decrease in the regenerative electric power amount can still be correspondingly suppressed compared to the comparative example in which the regenerative brake ratio r1 (that is, the regenerative brake torque) is calculated based on the vehicle speed V. In other words, the ECU 19 can keep controlling the vehicle 1 so that the amount of the electric power that is input into the electric power supply 13 during the regeneration increases correspondingly or relatively even in a case where the supply input electric power value Pin becomes equal to or less than the predetermined threshold TH2 and the regenerative brake ratio r1 is fixed at zero.

According to the above description, the vehicle 1 is provided with the motor generator 11 that is capable of applying the regenerative brake torque to the vehicle 1. As described above, however, the vehicle 1 may be provided with the motor generator 11 that generates electric power and does not apply the regenerative brake torque to the vehicle 1. For example, the vehicle 1 may be provided with the motor generator 11 that generates electric power by using power which differs from the power transmitted from the axle 181 (or the kinetic energy of the vehicle 1). Even in this case, a torque similar to the regenerative brake torque is still generated in the rotating shaft of the motor generator 11 since the motor generator 11 generates electric power. Accordingly, even in a case where the vehicle 1 is provided with the motor generator 11 that does not apply the regenerative brake torque, the ECU 19 may calculate the required braking torque command value Tr0 in the above-described manner and may control the motor generator 11 based on the calculated required braking torque command value Tr0. In other words, even in a case where the vehicle 1 is provided with the motor generator 11 that does not apply the regenerative brake torque, the ECU 19 may adjust the electric power (typically, the magnitude of the electric power) that is generated by the motor generator 11 by controlling the motor generator 11 based on the required braking torque command value Tr0.

As a result, the ECU 19 can control the vehicle 1 so that the amount of the electric power that is input into the electric power supply 13 during the generation of the electric power by the motor generator 11 increases correspondingly or relatively while the output of the electric power from the electric power supply 13 during the generation of the electric power by the motor generator 11 is suppressed even in a case where the vehicle 1 is provided with the motor generator 11 that does not apply the regenerative brake torque. In a case where the vehicle 1 is provided with the motor generator 11 that does not apply the regenerative brake torque, the ECU 19 may not calculate the hydraulic brake torque command value Tr2 in the manner illustrated in FIG. 3. In this case, for example, the ECU 19 may calculate the hydraulic brake torque command value Tr2 that is equal to the required braking torque command value Tr0.

Next, a vehicle 2 according to a second embodiment will be described with reference to FIGS. 7 to 10. The same reference numerals and step numbers will be used to refer to the same components and operations as in the vehicle 1 according to the first embodiment, and description thereof will be omitted.

Figure 7:
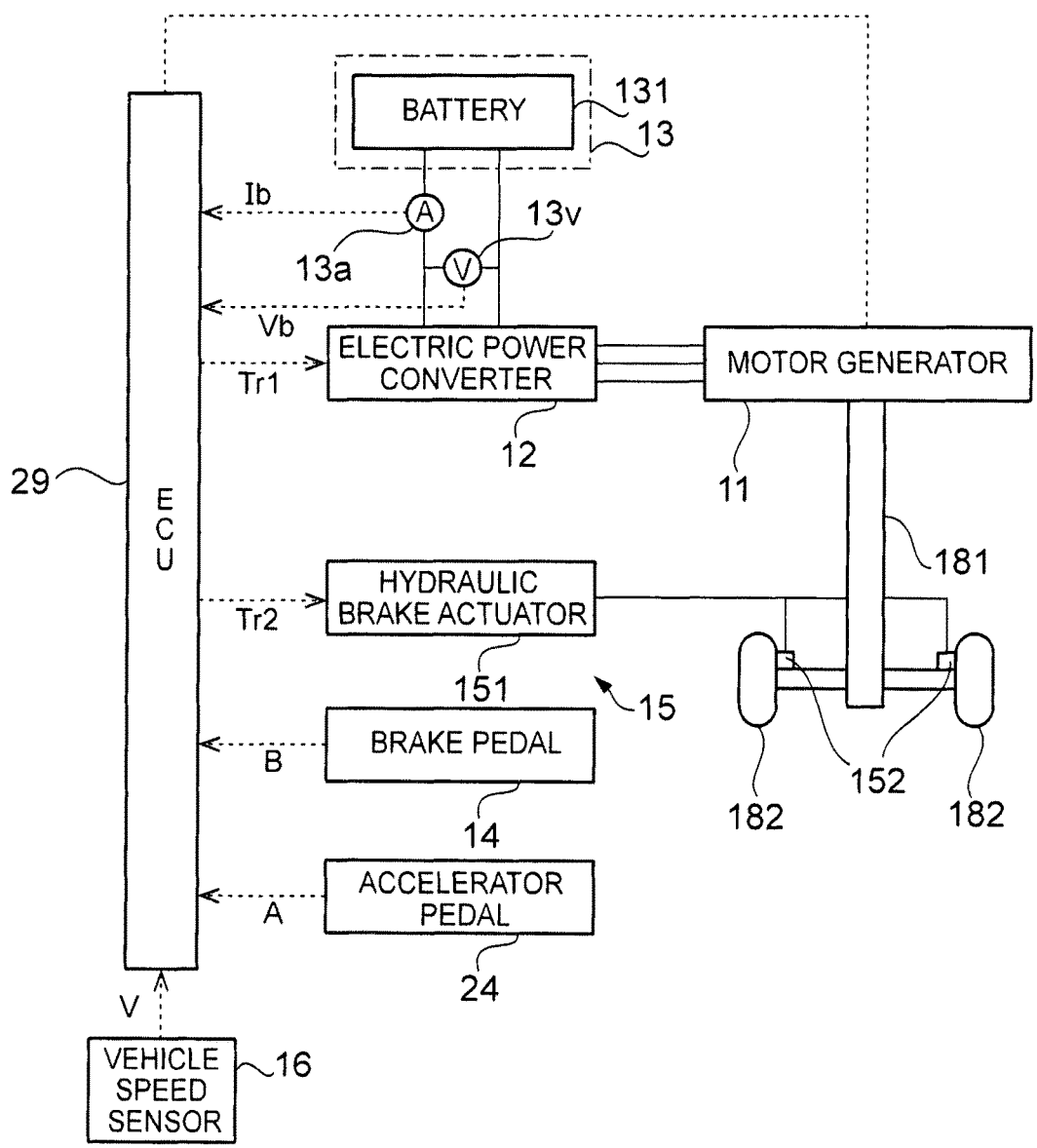
FIG. 7 is a block diagram illustrating an example of the configuration of a vehicle according to a second embodiment of the invention.
Figure 8:
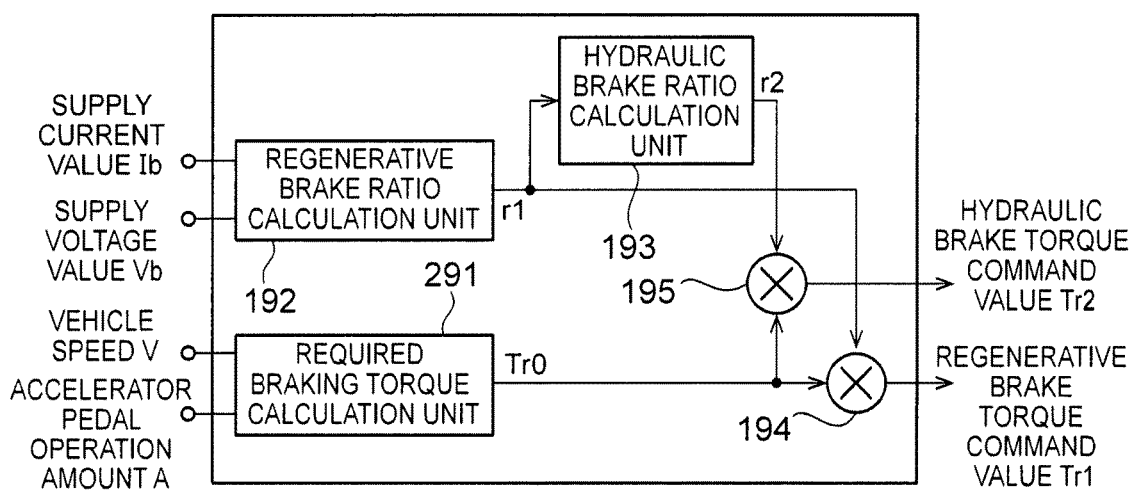
FIG. 8 is a block diagram illustrating the configuration of a processing block for regenerative brake torque command value and hydraulic brake torque command value calculation among the processing blocks that are logically realized in an ECU of the vehicle according to the second embodiment.

Firstly, the configuration of the vehicle 2 according to the second embodiment will be described with reference to FIGS. 7 and 8. FIG. 7 is a block diagram illustrating an example of the configuration of the vehicle 2 according to the second embodiment. FIG. 8 is a block diagram illustrating the configuration of a processing block for the calculation of the regenerative brake torque command value Tr1 and the hydraulic brake torque command value Tr2 among the processing blocks that are logically realized in an ECU 29 of the vehicle 2 according to the second embodiment.

As illustrated in FIG. 7, the vehicle 2 according to the second embodiment is different from the vehicle 1 according to the first embodiment, in which the ECU 19 may not acquire an accelerator pedal operation amount A so as to calculate the required braking torque command value Tr0, in that the ECU 29 acquires the accelerator pedal operation amount A as the amount of the operation of an accelerator pedal 24 so as to calculate the required braking torque command value Tr0. The rest of the configuration of the vehicle 2 according to the second embodiment may be identical to the rest of the configuration of the vehicle 1 according to the first embodiment.

The accelerator pedal 24 is an operation pedal that is operated by the driver of the vehicle 1. Typically, the driver operates the operation pedal to be depressed or returned so as to adjust the speed of the vehicle 1. The ECU 29 appropriately acquires the accelerator pedal operation amount A that is the amount of the operation of the accelerator pedal 24 (typically, the amount of depression).

As illustrated in FIG. 8, the ECU 29 of the second embodiment is different from the ECU 19 of the first embodiment, which may not calculate the required braking torque command value Tr0 based on the accelerator pedal operation amount A and the vehicle speed V, in that the ECU 29 calculates the required braking torque command value Tr0 based on the accelerator pedal operation amount A and the vehicle speed V. Accordingly, the ECU 29 is provided with a required braking torque calculation unit 291 that calculates the required braking torque command value Tr0 based on the accelerator pedal operation amount A and the vehicle speed V instead of the required braking torque calculation unit 191 that calculates the required braking torque command value Tr0 based on the brake pedal operation amount B and the vehicle speed V. The ECU 29 may also be provided with the required braking torque calculation unit 191 that calculates the required braking torque command value Tr0 based on the brake pedal operation amount B and the vehicle speed V. The operation for calculating the required braking torque command value Tr0 based on the accelerator pedal operation amount A and the vehicle speed V will be described later (refer to FIGS. 9 and 10).

Figure 9:
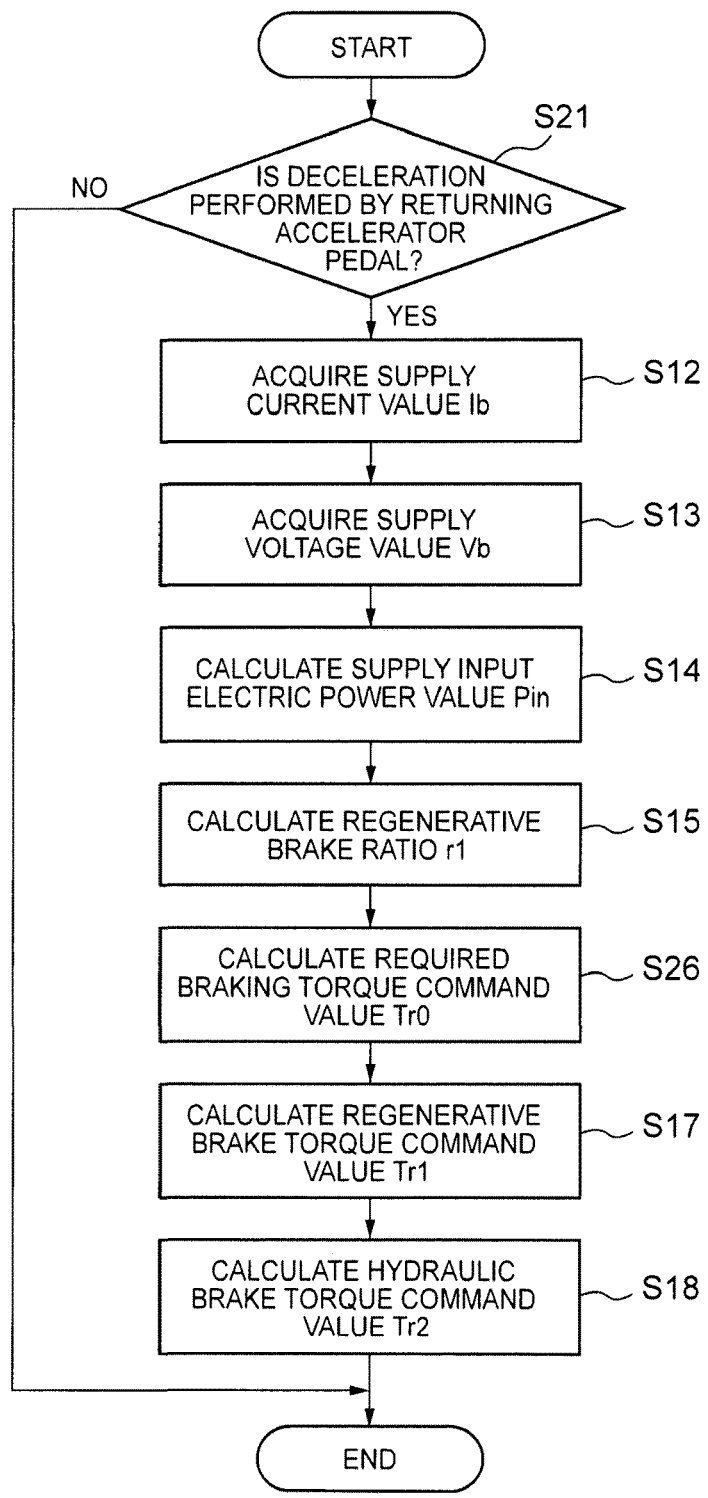
FIG. 9 is a flowchart illustrating the flow of the regenerative brake torque command value and hydraulic brake torque command value calculation operation that is performed by the ECU of the second embodiment.

Next, the flow of the operation for the calculation of the regenerative brake torque command value Tr1 and the hydraulic brake torque command value Tr2 that is performed by the ECU 29 will be described with reference to FIG. 9. FIG. 9 is a flowchart illustrating the flow of the operation for the calculation of the regenerative brake torque command value Tr1 and the hydraulic brake torque command value Tr2 that is performed by the ECU 29.

As illustrated in FIG. 9, the ECU 29 determines whether or not the driver is performing the operation for returning the accelerator pedal 24 (Step S21). For example, the ECU 29 may determine whether or not the driver is performing the operation for returning the accelerator pedal 24 by monitoring the accelerator pedal operation amount A.

The "operation for returning the accelerator pedal 24" may include an "operation for a transition from a state where the accelerator pedal 24 is depressed (that is, a state where the accelerator pedal operation amount A is not zero) to a state where the accelerator pedal 24 is not depressed (that is, a state where the accelerator pedal operation amount A is zero)". The "operation for returning the accelerator pedal 24" may include an "operation for a transition from a state where the accelerator pedal 24 is depressed by a first predetermined operation amount (that is, a state where the accelerator pedal operation amount A is equal to the first predetermined operation amount) to a state where the accelerator pedal 24 is depressed by a second predetermined operation amount exceeded by the first predetermined operation amount (that is, a state where the accelerator pedal operation amount A is equal to the second predetermined operation amount exceeded by the first predetermined operation amount)".

In a case where it is determined that the driver is not performing the operation for returning the accelerator pedal 24 as a result of the determination of Step S21 (Step S21: No), the ECU 29 may not calculate the regenerative brake torque command value Tr1 and the hydraulic brake torque command value Tr2. In this case, the ECU 29 may terminate the operation.

In a case where it is determined that the driver is performing the operation for returning the accelerator pedal 24 as a result of the determination of Step S21 (Step S21: Yes), it is estimated that the driver is to adjust the vehicle speed V by returning the accelerator pedal 24. In other words, it is estimated that the driver is to decelerate the vehicle 2 by returning the accelerator pedal 24. In this case, the ECU 29 may realize the deceleration of the vehicle 2 by applying the regenerative brake torque.

In a case where the deceleration of the vehicle 2 is realized by applying the regenerative brake torque in accordance with the operation for returning the accelerator pedal 24, the ECU 29 calculates the regenerative brake ratio r1 that shows the ratio of the regenerative brake torque to the required braking torque by performing the operations of Step S12 to Step S15 (Step S12 to Step S15) as in the case of the ECU 19 according to the first embodiment.

The calculation of the required braking torque command value Tr0 by the ECU 29 (Step S26) follows, in tandem or in parallel, the operation for the calculation of the regenerative brake ratio r1 that is illustrated in Step S12 to Step S15. Specifically, the required braking torque calculation unit 291 of the ECU 29 calculates the required braking torque command value Tr0 based on the vehicle speed V and the accelerator pedal operation amount A. In this case, the required braking torque calculation unit 291 may calculate the required braking torque command value Tr0 by referring to a required braking torque map that shows the association between the vehicle speed V and the accelerator pedal operation amount A, and the required braking torque command value Tr0.

Figure 10:
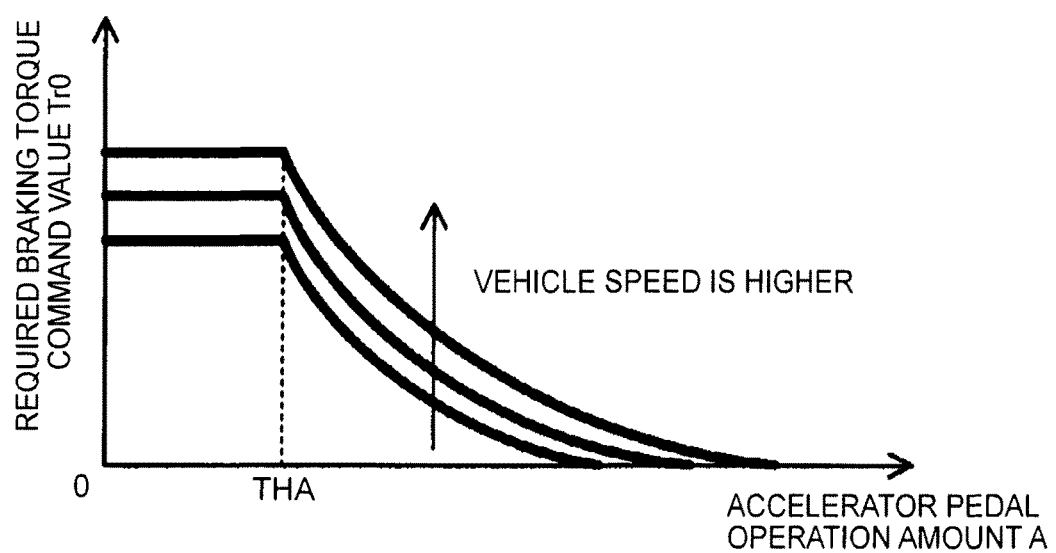
FIG. 10 is a graph illustrating an example of a required braking torque map that shows the association between a vehicle speed and an accelerator pedal operation amount, and a required braking torque command value according to the second embodiment.

Hereinafter, the required braking torque map that shows the association between the vehicle speed V and the accelerator pedal operation amount A, and the required braking torque command value Tr0 will be described with reference to FIG. 10. FIG. 10 is a graph illustrating an example of the required braking torque map that shows the association between the vehicle speed V and the accelerator pedal operation amount A, and the required braking torque command value Tr0.

As illustrated in FIG. 10, the required braking torque command value Tr0 is a constant value, regardless of the magnitude of the accelerator pedal operation amount A, in an area where the accelerator pedal operation amount A is equal to or less than a predetermined operation amount THA. The required braking torque command value Tr0 decreases as the accelerator pedal operation amount A increases in an area where the accelerator pedal operation amount A is equal to or greater than the predetermined operation amount THA. The required braking torque command value Tr0 increases as the vehicle speed V increases in the case of the same accelerator pedal operation amount A. The required braking torque map that is illustrated in FIG. 10 is an example. Accordingly, a required braking torque map that is different from the required braking torque map illustrated in FIG. 10 may also be used.

Referring back to FIG. 9, the ECU 29 then calculates the regenerative brake torque command value Tr1 and the hydraulic brake torque command value Tr2 (Step S17 and Step S18) as in the case of the ECU 19 according to the first embodiment.

The vehicle 2 according to the second embodiment described above can appropriately achieve the various effects that can be achieved by the vehicle 1 according to the first embodiment even in a case where the brake pedal 14 is not operated. For example, the ECU 29 can control the vehicle 1 so that the amount of the electric power that is input into the electric power supply 13 during the regeneration increases correspondingly or relatively while the output of the electric power from the electric power supply 13 during the regeneration is suppressed even in a case where the brake pedal 14 is not operated.

Next, a vehicle 3 according to a third embodiment will be described with reference to FIGS. 11A to 11C to FIG. 13. The same reference numerals and step numbers will be used to refer to the same components and operations as in the vehicle 1 according to the first embodiment and the vehicle 2 according to the second embodiment, and description thereof will be omitted.

Figure 11A:
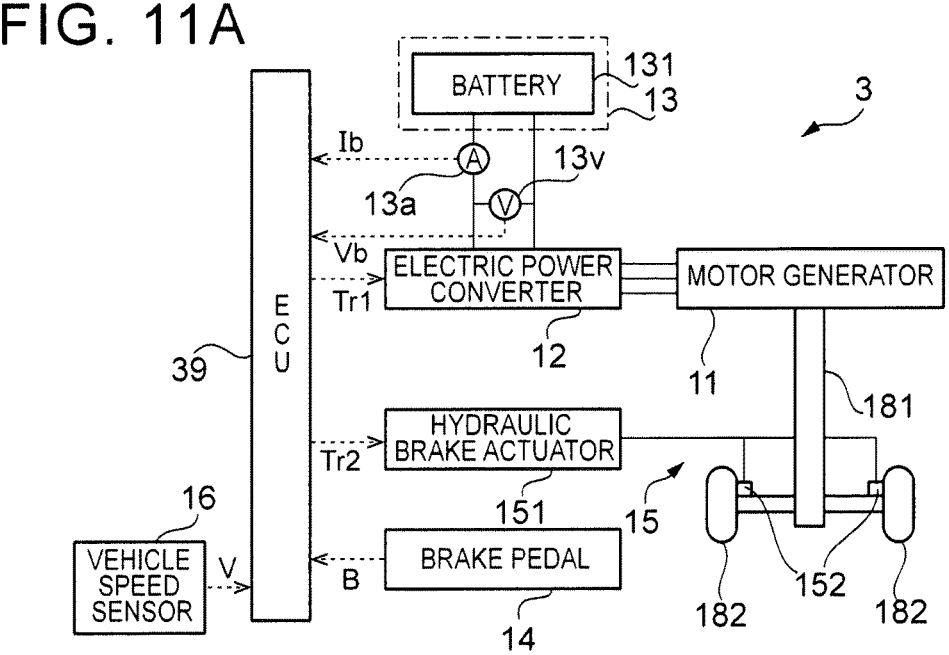
FIG. 11A is a block diagram illustrating an example of the configuration of a vehicle according to a third embodiment of the invention.
Figure 11B:
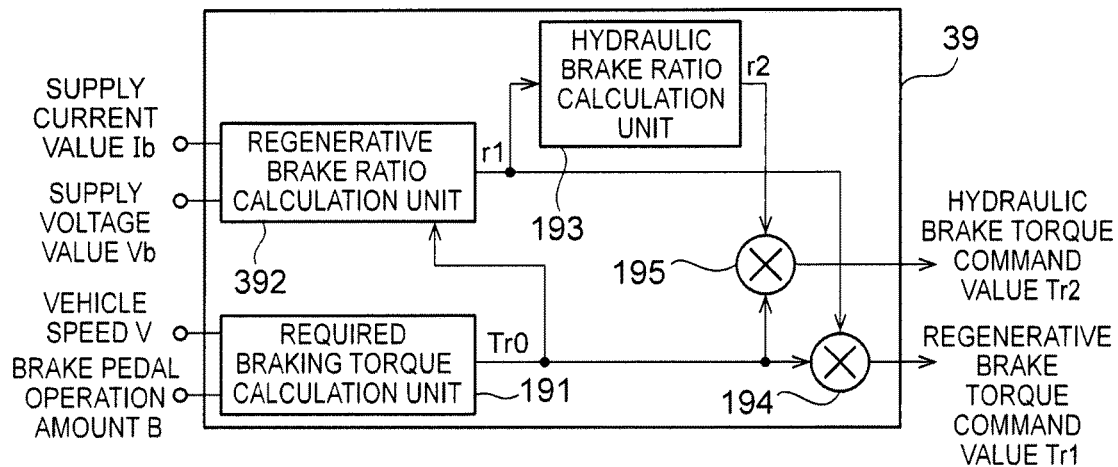
FIG. 11B is a block diagram illustrating the configuration of a processing block for regenerative brake torque command value and hydraulic brake torque command value calculation among the processing blocks that are logically realized in an ECU of the vehicle according to the third embodiment.
Figure 11C:
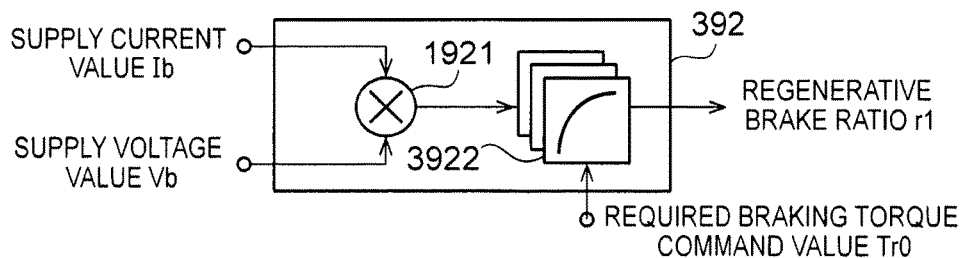
FIG. 11C is a block diagram illustrating the configuration of a regenerative brake ratio calculation unit of the ECU of the third embodiment.

Firstly, the configuration of the vehicle 3 according to the third embodiment will be described with reference to FIGS. 11A to 11C. FIG. 11A is a block diagram illustrating an example of the configuration of the vehicle 3 according to the third embodiment. FIG. 11B is a block diagram illustrating the configuration of a processing block for the calculation of the regenerative brake torque command value Tr1 and the hydraulic brake torque command value Tr2 among the processing blocks that are logically realized in an ECU 39 of the vehicle 3 according to the third embodiment. FIG. 11C is a block diagram illustrating the configuration of a regenerative brake ratio calculation unit 392 of the ECU 39.

As illustrated in FIG. 11A, the vehicle 3 according to the third embodiment is different from the vehicle 1 according to the first embodiment in that the vehicle 3 is provided with the ECU 39 instead of the ECU 19. The rest of the configuration of the vehicle 3 according to the third embodiment may be identical to the rest of the configuration of the vehicle 1 according to the first embodiment.

As illustrated in FIG. 11B, the ECU 39 of the third embodiment is different from the ECU 19 of the first embodiment, in which the regenerative brake ratio calculation unit 192 may not calculate the regenerative brake ratio r1 based on the required braking torque command value Tr0, in that the regenerative brake ratio calculation unit 392 calculates the regenerative brake ratio r1 based on the required braking torque command value Tr0 compared to the ECU 19 according to the first embodiment. More specifically, the regenerative brake ratio calculation unit 392 of the third embodiment as illustrated in FIG. 11C is different from the regenerative brake ratio calculation unit 192 of the first embodiment, in which the map reference unit 1922 may not calculate the regenerative brake ratio r1 based on the required braking torque command value Tr0, in that a map reference unit 3922 calculates the regenerative brake ratio r1 based on the required braking torque command value Tr0 compared to the regenerative brake ratio calculation unit 192 according to the first embodiment. The rest of the configuration of the ECU 39 of the third embodiment may be identical to the rest of the configuration of the ECU 19 of the first embodiment.

Figure 12:
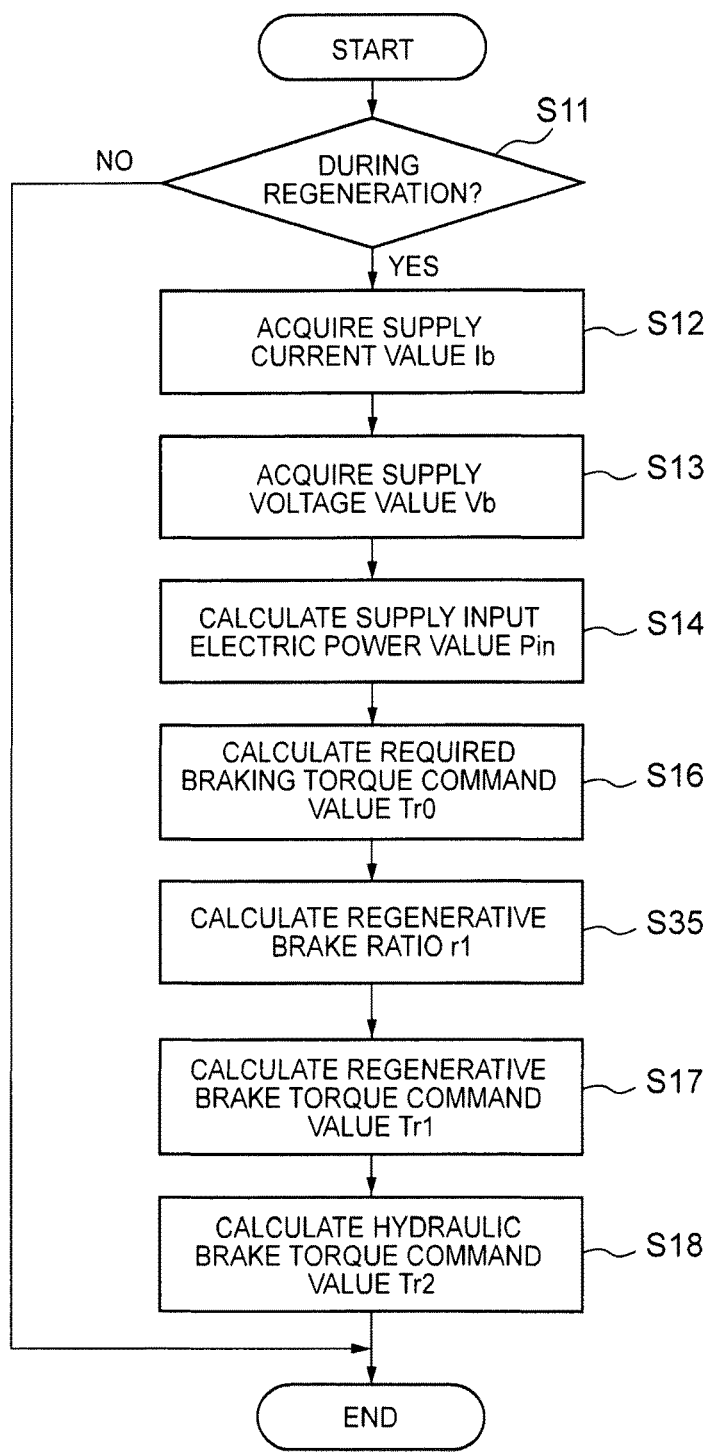
FIG. 12 is a flowchart illustrating the flow of the regenerative brake torque command value and hydraulic brake torque command value calculation operation that is performed by the ECU of the third embodiment.

The flow of the operation for the calculation of the regenerative brake torque command value Tr1 and the hydraulic brake torque command value Tr2 that is performed by the ECU 39 will be described with reference to FIG. 12. FIG. 12 is a flowchart illustrating the flow of the operation for the calculation of the regenerative brake torque command value Tr1 and the hydraulic brake torque command value Tr2 that is performed by the ECU 39.

As illustrated in FIG. 12, the ECU 39 determines whether or not the vehicle 1 is in a condition during regeneration (Step S11). In a case where it is determined that the vehicle 1 is in a condition during regeneration as a result of the determination of Step S11 (Step S11: Yes), the ECU 39 calculates the supply input electric power value Pin by performing the operations of Step S12 to Step S14 (Step S12 to Step S14) as in the case of the ECU 19 of the first embodiment.

In the third embodiment, the calculation of the required braking torque command value Tr0 by the ECU 39 (Step S16) follows, in tandem or in parallel, the operation for the calculation of the supply input electric power value Pin that is illustrated in Step S12 to Step S14. In other words, in the third embodiment, the ECU 39 calculates the required braking torque command value Tr0 before the calculation of the regenerative brake ratio r1.

Then, the regenerative brake ratio calculation unit 392 of the ECU 39 calculates the regenerative brake ratio r1 (Step S35) based on the supply input electric power value Pin that is calculated in Step S14 and the required braking torque command value Tr0 that is calculated in Step S16. Specifically, the map reference unit 3922 of the regenerative brake ratio calculation unit 392 calculates the regenerative brake ratio r1 by referring to a regenerative brake ratio map that defines the association between the supply input electric power value Pin and the required braking torque command value Tr0, and the regenerative brake ratio r1.

Figure 13:
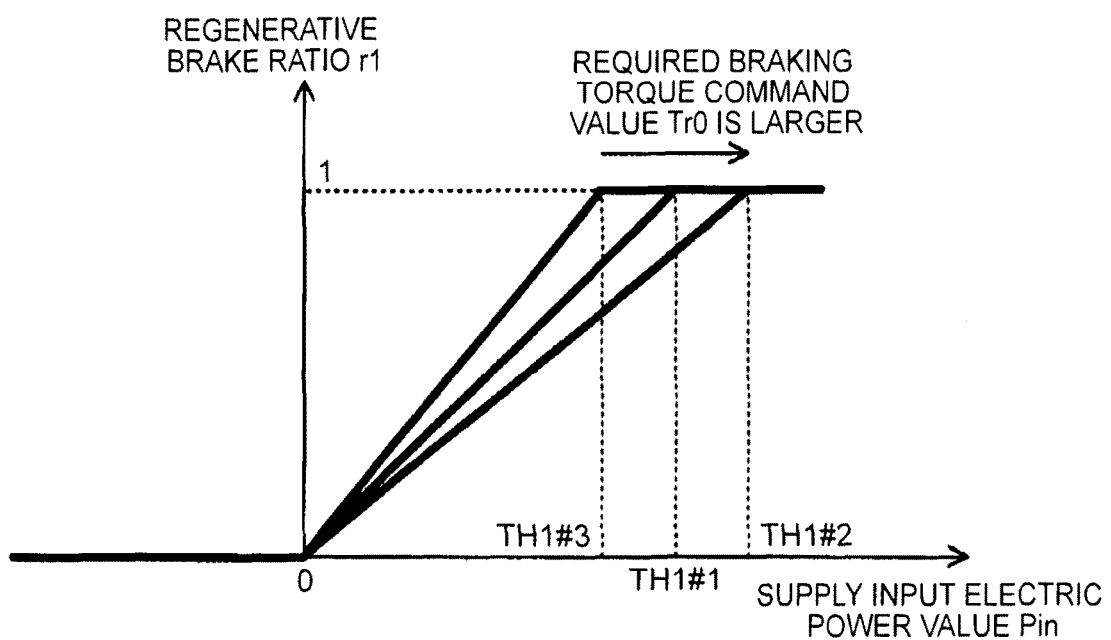
FIG. 13 is a graph illustrating an example of a regenerative brake ratio map that defines the association between a supply input electric power value and a required braking torque command value, and a regenerative brake ratio according to the third embodiment.

The regenerative brake ratio map that defines the association between the supply input electric power value Pin and the required braking torque command value Tr0, and the regenerative brake ratio r1 will be described with reference to FIG. 13. FIG. 13 is a graph illustrating an example of a regenerative brake ratio map that defines the association between the supply input electric power value Pin and the required braking torque command value Tr0, and the regenerative brake ratio r1.

As in the case of the regenerative brake ratio map according to the first embodiment, (i) the regenerative brake ratio r1 is fixed at one regardless of the magnitude of the supply input electric power value Pin in the first area where the supply input electric power value Pin exceeds the predetermined threshold, (ii) the regenerative brake ratio r1 decreases as the supply input electric power value Pin decreases in the second area where the supply input electric power value Pin is equal to or less than the predetermined threshold TH1 and exceeds zero, and (iii) the regenerative brake ratio r1 is fixed at zero regardless of the magnitude of the supply input electric power value Pin in the third area where the supply input electric power value Pin is equal to or less than zero even in the third embodiment as illustrated in FIG. 13.

In the third embodiment, in particular, the predetermined threshold TH1 varies depending on the required braking torque command value Tr0. Specifically, the predetermined threshold TH1 increases as the required braking torque command value Tr0 increases. In a case where the required braking torque command value Tr0 has the value of "Tr0#1", for example, the predetermined threshold TH1 has the value of "TH1#1". In a case where the required braking torque command value Tr0 has the value of "Tr0#2 (Tr0#2>Tr#1)", for example, the predetermined threshold TH1 has the value of "TH1#2 (TH1#2>TH1#1)". In a case where the required braking torque command value Tr0 has the value of "Tr0#3 (Tr0#3<Tr#1)", for example, the predetermined threshold TH1 has the value of "TH1#3 (TH1#3<TH1#1)".

In other words, in the third embodiment using the regenerative brake ratio map illustrated in FIG. 13, the timing when the regenerative brake ratio r1 begins to decrease (that is, begins to become less than one) is advanced as the required braking torque command value Tr0 increases. In other words, the timing when the hydraulic brake ratio r2 begins to increase (that is, begins to exceed zero) is advanced as the required braking torque command value Tr0 increases. Accordingly, it can be said that the regenerative brake ratio map that is used in the third embodiment defines the regenerative brake ratio r1 allowing the timing of the initiation of the application of the hydraulic brake torque to the vehicle 1 to be advanced as the required braking torque command value Tr0 increases.

Referring back to FIG. 12, the ECU 39 then calculates the regenerative brake torque command value Tr1 and the hydraulic brake torque command value Tr2 (Step S17 and Step S18) as in the case of the ECU 19 according to the first embodiment.

The vehicle 3 according to the third embodiment described above can appropriately achieve the various effects that can be achieved by the vehicle 1 according to the first embodiment. For example, the ECU 39 can control the vehicle 1 so that the amount of the electric power that is input into the electric power supply 13 during the regeneration increases correspondingly or relatively while the output of the electric power from the electric power supply 13 during the regeneration is suppressed.

In addition, the ECU 39 can calculate the regenerative brake ratio r1 so that the required braking torque corresponding to the required braking torque command value Tr0 is appropriately applied to the vehicle 3. In particular, the ECU 39 can calculate the regenerative brake ratio r1 so that the required braking torque corresponding to the required braking torque command value Tr0 is appropriately applied to the vehicle 3 even in a case where the regenerative brake ratio r1 gradually decreases toward zero. Hereinafter, the technical effect that is realized by calculating the regenerative brake ratio r1 based on the required braking torque command value Tr0 will be described.

The hydraulic brake ratio r2 increases as the regenerative brake ratio r1 decreases. Accordingly, the hydraulic brake ratio r2 increases in a case where the regenerative brake ratio r1 decreases as the supply input electric power value Pin decreases. Accordingly, the hydraulic brake torque increases as the regenerative brake torque decreases (refer to FIGS. 5 and 6).

The vehicle 3 is more likely to stop relatively early in a case where the required braking torque command value Tr0 is relatively high than in a case where the required braking torque command value Tr0 is relatively low. Accordingly, it is preferable that the timing when the regenerative brake torque becomes zero (that is, the regeneration stops) is relatively earlier in a case where the required braking torque command value Tr0 is relatively high than in a case where the required braking torque command value Tr0 is relatively low. As a result, it is preferable that the regenerative brake ratio r1 (that is, the regenerative brake torque) decreases (that is, declines) at a relatively higher speed in a case where the required braking torque command value Tr0 is relatively high than in a case where the required braking torque command value Tr0 is relatively low. In other words, it is preferable that the hydraulic brake ratio r2 (that is, the hydraulic brake torque) rises (that is, increases) at a relatively higher speed in a case where the required braking torque command value Tr0 is relatively high than in a case where the required braking torque command value Tr0 is relatively low.

However, the hydraulic brake torque is a torque that is generated by using the hydraulic pressure, and thus it is difficult to increase the hydraulic brake torque with rapidity. In addition, the adoption of the hydraulic brake actuator 151 that has specifications allowing the hydraulic brake torque to be increased with rapidity is not practical because this may cause the size and the cost of the hydraulic brake unit 15 to increase. Accordingly, it becomes difficult for the hydraulic brake actuator 151 to raise (that is, increase) the hydraulic brake torque at a rate of increase allowing the required braking torque corresponding to the required braking torque command value Tr0 to be appropriately applied to the vehicle 3 as the required braking torque command value Tr0 increases.

In the third embodiment, the ECU 39 calculates the regenerative brake ratio r1 based on the required braking torque command value Tr0 so as to address the technical difficulties. Specifically, the ECU 39 calculates the regenerative brake ratio r1 so that the timing of the initiation of the application of the hydraulic brake torque to the vehicle 1 is advanced as the required braking torque command value Tr0 increases. Accordingly, a longer period of time for increasing the hydraulic brake torque is ensured as the required braking torque command value Tr0 increases. In other words, an excessive increase in the rate of hydraulic brake torque increase that is required for appropriately applying the required braking torque corresponding to the required braking torque command value Tr0 to the vehicle 3 rarely or never occurs even when the required braking torque command value Tr0 increases. Accordingly, even when the required braking torque command value Tr0 increases, the hydraulic brake actuator 151 can raise (that is, increase) the hydraulic brake torque at a rate of increase allowing the required braking torque corresponding to the required braking torque command value Tr0 to be appropriately applied to the vehicle 3. Accordingly, even when the required braking torque command value Tr0 increases, the required braking torque corresponding to the required braking torque command value Tr0 can be appropriately applied to the vehicle 3. Accordingly, deterioration in the braking performance of the vehicle 3 and deterioration in the drivability of the vehicle 3 are appropriately suppressed.

Figure 14:
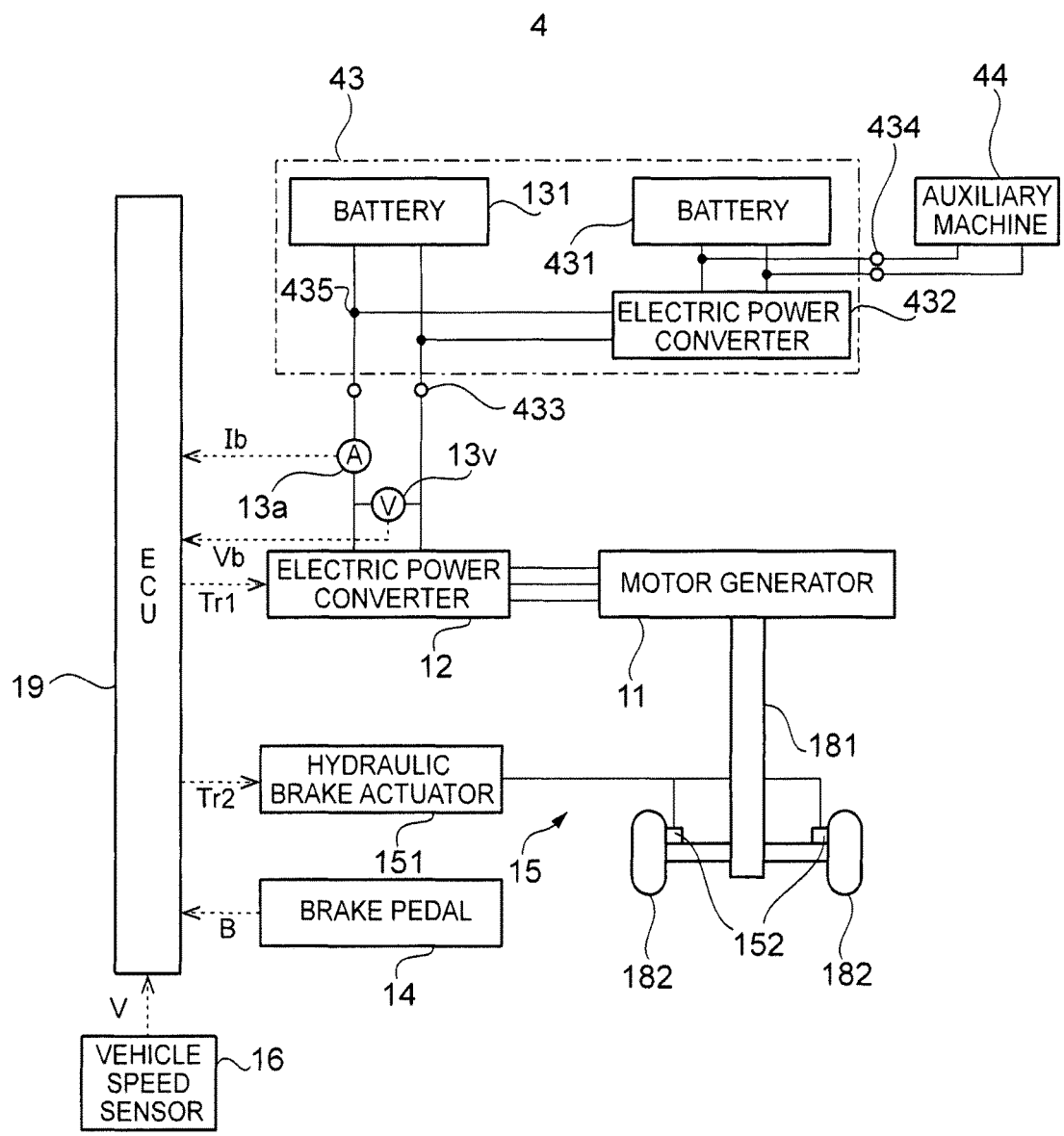
FIG. 14 is a block diagram illustrating an example of the configuration of a vehicle according to a fourth embodiment of the invention.

Next, a vehicle 4 according to a fourth embodiment will be described with reference to FIG. 14. FIG. 14 is a block diagram illustrating an example of the configuration of the vehicle 4 according to the fourth embodiment. The same reference numerals and step numbers will be used to refer to the same components and operations as in the vehicle 1 according to the first embodiment, the vehicle 2 according to the second embodiment, and the vehicle 3 according to the third embodiment, and description thereof will be omitted.

As illustrated in FIG. 14, the vehicle 4 according to the fourth embodiment is different from the vehicle 1 according to the first embodiment, in which the electric power supply 13 may not be provided with a plurality of batteries, in that an electric power supply 43 is provided with a plurality of batteries that are electrically connected in parallel (two batteries 131, 431 in the example illustrated in FIG. 14). In addition, the vehicle 4 according to the fourth embodiment is different from the vehicle 1 according to the first embodiment, which may not be provided with an auxiliary machine 44, in that the vehicle 4 according to the fourth embodiment is provided with the auxiliary machine 44. The rest of the configuration of the vehicle 4 according to the fourth embodiment may be identical to the rest of the configuration of the vehicle 1 according to the first embodiment.

The electric power supply 43 is provided with not only the battery 131 but also the battery 431 that is electrically connected in parallel to the battery 131. The electric power supply 43 may also be provided with a battery that is electrically connected in series to the battery 131 in addition to or in place of the battery 431 that is electrically connected in parallel to the battery 131.

The battery 431 is a secondary battery that is capable of performing electric power output (that is, discharging) and electric power input (that is, charging). Examples of the battery include a lead storage battery, a lithium-ion battery, a nickel-hydrogen battery, and a fuel cell. The electric power supply 43 may be provided with a capacitor such as an electric double layer capacitor in addition to or in place of the battery 431.

In the fourth embodiment, the voltage (that is, the inter-terminal voltage) of the battery 131 is different from the voltage (that is, the inter-terminal voltage) of the battery 431. Typically, the voltage of the battery 131 is higher than the voltage of the battery 431. For example, the voltage of the battery 131 is equal to the inter-terminal voltage of a first input and output terminal 433 of the electric power supply 43 (specifically, an input and output terminal electrically connected to the electric power converter 12). The voltage of the battery 431 is different from the voltage of the first input and output terminal 433 of the electric power supply 43. Likewise, the voltage of the battery 131 is different from the inter-terminal voltage of a second input and output terminal 434 of the electric power supply 43 (specifically, an input and output terminal electrically connected to the auxiliary machine 44). The voltage of the battery 431 is equal to the voltage of the second input and output terminal 434 of the electric power supply 43.

It is preferable that the electric power supply 43 is provided with an electric power converter 432 since the voltage of the battery 131 is different from the voltage of the battery 431. The electric power converter 432 performs voltage conversion on the electric power that is exchanged between the battery 431 and at least one of the battery 131 and the first input and output terminal 433. In addition, the electric power converter 432 performs voltage conversion on the electric power that is exchanged between the battery 131 and at least one of the battery 431 and the second input and output terminal 434. Typically, the electric power converter 432 is a converter (so-called DC-DC converter) that is capable of voltage conversion.

The voltage of the battery 131 may be equal to the voltage of the battery 431. In this case, the electric power supply 43 may not be provided with the electric power converter 432.

During the powering, the motor generator 11 is driven mainly by using the electric power that is output from the battery 131. During the powering, the motor generator 11 may be driven by using the electric power that is output from the battery 431 in addition to or in place of the electric power that is output from the battery 131. During the regeneration, the motor generator 11 mainly charges the battery 131. During the regeneration, the motor generator 11 charges the battery 431 in addition to or in place of charging the battery 131.

The auxiliary machine 44 is an electrical load that is driven mainly by using the electric power that is output from the battery 431. The auxiliary machine 44 may be driven by using the electric power that is output from the battery 131 in addition to or in place of using the electric power that is output from the battery 431. In addition, the auxiliary machine 44 may be driven by using the electric power that is input into the electric power supply 43 via the first input and output terminal 433 during the regeneration (that is, the electric power generated by the regeneration of the motor generator 11) in addition to or in place of using the electric power that is output from at least one of the battery 131 and the battery 431. Examples of the auxiliary machine 44 include a starter motor, an air conditioner, a steering device such as electric power steering (EPS), and a braking device such as the hydraulic brake unit 15.

Even in a case where the electric power supply 43 is provided with the batteries 131, 431 that are electrically connected in parallel, the supply current sensor 13a detects the supply current value Ib that shows the magnitude of the current which flows between the electric power converter 12 and the electric power supply 43. In other words, the supply current sensor 13a detects the supply current value Ib that shows the magnitude of the current which flows between the electric power converter 12 and the first input and output terminal 433 of the electric power supply 43. In other words, the supply current sensor 13a detects the supply current value Ib that shows the magnitude of the current which flows between the electric power converter 12 and a battery connection point 435 in the electric power supply 43. The battery connection point 435 corresponds to a position where an electric power path toward the battery 131 and an electric power path toward the battery 431 are connected to each other (that is, where an electric power path from the electric power converter 12 toward the electric power supply 43 branches into an electric power path toward the battery 131 and an electric power path toward the battery 431).

Likewise, even in a case where the electric power supply 43 is provided with the batteries 131, 431 that are electrically connected in parallel, the supply voltage sensor 13v detects the supply voltage value Vb that shows the magnitude of the inter-terminal voltage of the electric power supply 43. In other words, the supply voltage sensor 13v detects the supply voltage value Vb that is the inter-terminal voltage of the electric power line between the electric power converter 12 and the first input and output terminal 433 of the electric power supply 43. In other words, the supply voltage sensor 13v detects the supply voltage value Vb that shows the magnitude of the inter-terminal voltage of the electric power line between the electric power converter 12 and the battery connection point 435 in the electric power supply 43.

The vehicle 4 according to the fourth embodiment described above can appropriately achieve the various effects that can be achieved by the vehicle 1 according to the first embodiment. For example, the ECU 19 can control the vehicle 4 so that the amount of the electric power that is input into the electric power supply 43 during the regeneration increases correspondingly or relatively while the output of the electric power from the electric power supply 43 during the regeneration is suppressed.

In the fourth embodiment, in particular, the supply current sensor 13a and the supply voltage sensor 13v are arranged between the electric power supply 43 and the electric power converter 12 even in a case where the electric power supply 43 is provided with the plurality of batteries that are electrically connected in parallel. Accordingly, even in a case where the electric power supply 43 is provided with the plurality of batteries that are electrically connected in parallel, the ECU 19 can control the vehicle 4 so that the amount of the electric power that is input into the electric power supply 43 during the regeneration increases correspondingly or relatively while the output of the electric power from the electric power supply 43 during the regeneration is suppressed.

Hereinafter, a vehicle in which the supply current sensor 13a and the supply voltage sensor 13v are arranged between the battery 131 and the battery connection point 435 in the electric power supply 43 will be described as a comparative example. When the supply current sensor 13a and the supply voltage sensor 13v are arranged between the battery 131 and the battery connection point 435, the supply input electric power value Pin shows the magnitude of the electric power that is input into the battery 131 instead of the electric power that is input into the electric power supply 43. In this case, the supply input electric power value Pin may be determined to be equal to or less than zero, regardless of the electric power input into the electric power supply 43 (that is, the entire electric power supply 43 being charged with the electric power that is generated by the motor generator 11), due to the following reason.

Specifically, it is as described above that the auxiliary machine 44 is driven mainly by using the electric power that is output from the battery 431. In a case where the electric power consumption by the auxiliary machine 44 is relatively large, however, the auxiliary machine 44 may be driven by using the electric power that is output from the battery 131 in addition to or in place of the electric power that is output from the battery 431. Accordingly, in the comparative example, the supply input electric power value Pin that shows the amount of the electric power which is input into the battery 131 varies depending on the electric power consumption by the auxiliary machine 44. Accordingly, in the comparative example, a situation occurs in which the supply input electric power value Pin becomes equal to or less than zero, regardless of the electric power input into the electric power supply 43, in a case where the electric power consumption by the auxiliary machine 44 is relatively large.

Figure 15A:
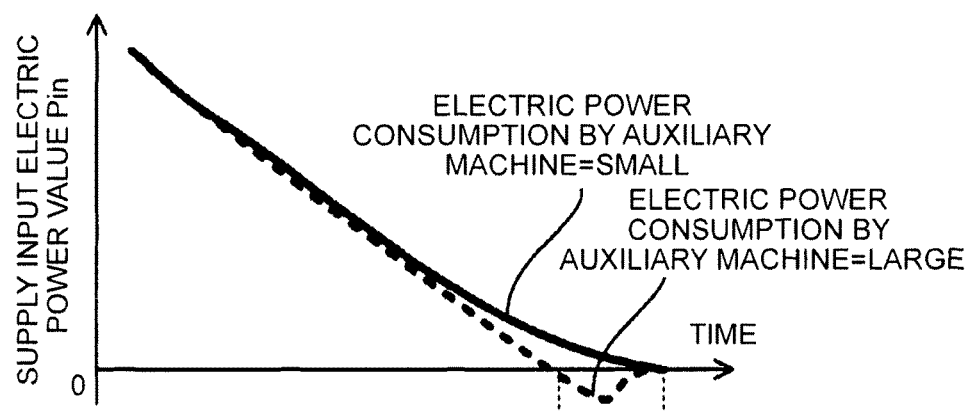
FIG. 15A is a graph illustrating a relationship between the electric power consumption by an auxiliary machine and a supply input electric power value according to a comparative example of the fourth embodiment.
Figure 15B:
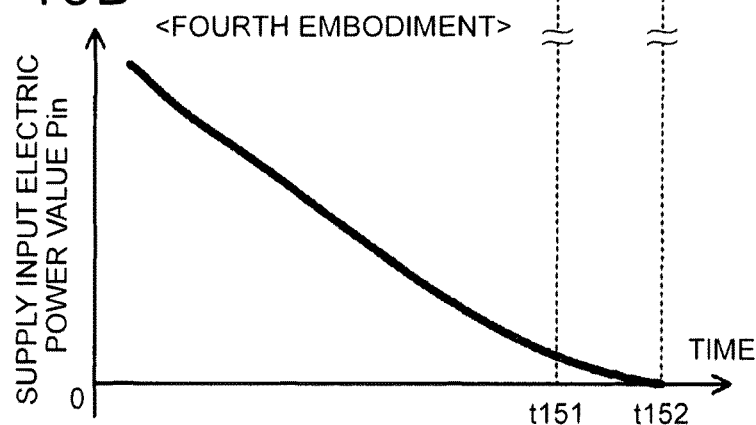
FIG. 15B is a graph illustrating a relationship between the electric power consumption by an auxiliary machine and a supply input electric power value according to the fourth embodiment.

An example in which the supply input electric power value Pin of the comparative example is changed by the electric power consumption by the auxiliary machine 44 will be described with reference to FIGS. 15A and 15B. FIG. 15A is a graph illustrating a relationship between the electric power consumption by the auxiliary machine 44 and the supply input electric power value Pin of the comparative example. FIG. 15B is a graph illustrating a relationship between the electric power consumption by the auxiliary machine 44 and the supply input electric power value Pin according to the fourth embodiment.

As illustrated in FIG. 15A, the auxiliary machine 44 is relatively more likely to be driven by using the electric power that is output from the battery 131 in a case where the electric power consumption by the auxiliary machine 44 is relatively large. Accordingly, in the comparative example, the likelihood of the occurrence of a situation in which the supply input electric power value Pin becomes equal to or less than zero regardless of the electric power input into the electric power supply 43 increases. In a case where the electric power consumption by the auxiliary machine 44 is relatively small, the auxiliary machine 44 becomes relatively less likely to be driven by using the electric power that is output from the battery 131. Accordingly, even in the comparative example, the likelihood of the occurrence of the situation in which the supply input electric power value Pin becomes equal to or less than zero regardless of the electric power input into the electric power supply 43 decreases.

As described above, in the comparative example, the situation in which the supply input electric power value Pin becomes equal to or less than zero regardless of the electric power input into the electric power supply 43 occurs particularly in a case where the electric power consumption by the auxiliary machine 44 is relatively large. As a result, the regenerative brake torque may become zero (that is, the regeneration may stop) regardless of the electric power input into the electric power supply 43. Accordingly, the amount of the electric power that is input into the electric power supply 43 during the regeneration may be excessively decreased (that is, decreased more than necessary).

In the fourth embodiment, however, the supply current sensor 13a and the supply voltage sensor 13v are arranged between the electric power supply 43 and the electric power converter 12 even in a case where the electric power supply 43 is provided with the plurality of batteries that are electrically connected in parallel. Accordingly, the supply input electric power value Pin of the fourth embodiment is rarely or never changed by the electric power consumption by the auxiliary machine 44 as illustrated in FIG. 15B. Accordingly, in the fourth embodiment, a situation rarely or never occurs in which the supply input electric power value Pin becomes equal to or less than zero regardless of the electric power input into the electric power supply 43. Accordingly, in the fourth embodiment, a situation rarely or never occurs in which the regenerative brake torque becomes zero (that is, the regeneration stops) regardless of the electric power input into the electric power supply 43 insofar as the regenerative brake torque command value Tr1 is calculated by using the regenerative brake ratio map in which the supply input electric power value Pin becomes zero and the regenerative brake ratio r1 becomes zero at the same time. As a result, an excessive decrease in the amount of the electric power that is input into the electric power supply 13 during the regeneration is suppressed.

The various configurations and the various operations that have been described with regard to the first to fourth embodiments above can be appropriately combined with each other. For example, the regenerative brake ratio r1 may be calculated based on the required braking torque command value Tr0, as in the case of the vehicle 3 according to the third embodiment, in the vehicle 2 in which the required braking torque command value Tr0 is calculated based on the accelerator pedal operation amount A.

The invention is not limited to the embodiments described above. Instead, the invention can be appropriately altered without departing from the essence or the spirit of the invention that is apparent from the claims and the entire specification. Any vehicle control apparatus entailing such alterations is included in the technical scope of the invention.

What is claimed is:

1. A vehicle control apparatus comprising:
 a regenerative device configured to generate electric power by performing regenerative operation, while applying a regenerative braking force;
 an electric power supply configured to exchange electric power with the regenerative device;
 a hydraulic device configured to apply a hydraulic braking force attributable to a hydraulic pressure; and
 an electronic control device configured to control the regenerative device and the hydraulic device so as to adjust a regenerative brake ratio represented as regenerative brake torque/required braking torque with respect to a required braking force required for the braking of the vehicle, based on an input electric power value showing magnitude of the electric power inputted into the electric power supply, wherein
 the electronic control device is configured to control the regenerative device and the hydraulic device such that the regenerative brake ratio becomes zero before the input electric power value becomes zero or at the same time as the input electric power value becomes zero.

2. The vehicle control apparatus according to claim 1, wherein the electronic control device is configured to control the regenerative device and the hydraulic device such that the regenerative brake ratio becomes zero in a case where the input electric power value satisfies a predetermined condition.

3. The vehicle control apparatus according to claim 1, wherein the electronic control device is configured to control the regenerative device and the hydraulic device such that the regenerative brake ratio becomes zero in a case where the input electric power value becomes equal to or less than a first predetermined amount, the first predetermined amount being equal to or greater than zero.

4. The vehicle control apparatus according to claim 1, wherein the electronic control device is configured to:
(i) control the regenerative device and the hydraulic device such that the regenerative brake ratio becomes constant, regardless of the input electric power value, in a case where the input electric power value is equal to or greater than a second predetermined amount, and
(ii) control the regenerative device and the hydraulic device such that the regenerative brake ratio decreases as the input electric power value decreases in a case where the input electric power value is less than the second predetermined amount.

5. The vehicle control apparatus according to claim 1, wherein the electronic control device is configured to control the regenerative device and the hydraulic device so as to adjust the regenerative brake ratio based on the input electric power value and the required braking force.

6. The vehicle control apparatus according to claim 5, wherein the electronic control device is configured to control the regenerative device and the hydraulic device such that a timing when the regenerative brake ratio begins to decrease is advanced as the required braking force increases.

7. The vehicle control apparatus according to claim 1, wherein the electronic control device is configured to control the regenerative brake ratio based on speed of the vehicle.

8. The vehicle control apparatus according to claim 1, wherein the electronic control device is configured to further control the regenerative device and the hydraulic device such that the regenerative brake ratio decreases as the input electric power value decreases.

9. A vehicle control apparatus comprising:
a regenerative device configured to generate electric power by performing regenerative operation, while applying a regenerative braking force;
an electric power supply configured to exchange electric power with the regenerative device;
a hydraulic device configured to apply a hydraulic braking force attributable to a hydraulic pressure;
an acquisition device configured to acquire an input electric power value showing magnitude of the electric power inputted into the electric power supply; and
an electronic control device configured to control the regenerative device and the hydraulic device so as to adjust a regenerative brake ratio represented as regenerative brake torque/required braking torque with respect to a required braking force based on the input electric power value acquired by the acquisition device, the required braking force being required for the braking of the vehicle,
wherein the electronic control device is configured to control the regenerative device and the hydraulic device such that the regenerative brake ratio becomes zero before the input electric power value becomes zero or at the same time as the input electric power value becomes zero.

10. The vehicle control apparatus according to claim 9, wherein the electronic control device is configured to further control the regenerative device and the hydraulic device such that the regenerative brake ratio decreases as the input electric power value decreases.

11. A vehicle control apparatus comprising:
a regenerative device configured to generate electric power by performing regenerative operation;
an electric power supply configured to exchange electric power with the regenerative device; and
an electronic control device configured to control the regenerative device so as to adjust the electric power generated by the regenerative device, based on an input electric power value showing magnitude of the electric power inputted into the electric power supply,
wherein the electronic control device is configured to control the regenerative device such that a regenerative brake ratio represented as regenerative brake torque/required braking torque becomes zero before the input electric power value becomes zero or at the same time as the input electric power value becomes zero.

12. The vehicle control apparatus according to claim 11, further comprising:
a hydraulic device configured to apply a hydraulic braking force attributable to a hydraulic pressure, wherein
the regenerative device is configured to generate the electric power by performing the regenerative operation, while applying the regenerative braking force, and
the electronic control device is configured to control the regenerative device and the hydraulic device so as to adjust the electric power generated by the regenerative device by adjusting the regenerative brake ratio with respect to a required braking force required for the braking of the vehicle based on the input electric power value.

13. The vehicle control apparatus according to claim 11, wherein the electronic control device is configured to further control the regenerative device and the hydraulic device such that the regenerative brake ratio decreases as the input electric power value decreases.

14. A vehicle control apparatus comprising:
a regenerative device configured to generate electric power by performing regenerative operation;
an electric power supply configured to exchange electric power with the regenerative device;
an acquisition device configured to acquire an input electric power value showing magnitude of the electric power inputted into the electric power supply; and
an electronic control device configured to control the regenerative device so as to adjust the electric power generated by the regenerative device, based on the input electric power value acquired by the acquisition device,
wherein the electronic control device is configured to control the regenerative device such that a regenerative brake ratio represented as regenerative brake torque/required braking torque becomes zero before the input electric power value becomes zero or at the same time as the input electric power value becomes zero.

15. The vehicle control apparatus according to claim 14, wherein the electronic control device is configured to further control the regenerative device and the hydraulic device such that the regenerative brake ratio decreases as the input electric power value decreases.

* * * * *